(12) United States Patent
Iwamura et al.

(10) Patent No.: US 8,359,324 B2
(45) Date of Patent: Jan. 22, 2013

(54) GEOGRAPHIC INFORMATION SYSTEM

(75) Inventors: Kazuaki Iwamura, Nishitokyo (JP);
Ryuji Mine, Kokubunji (JP); Yoriko Kazama, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 783 days.

(21) Appl. No.: 12/193,134

(22) Filed: Aug. 18, 2008

(65) Prior Publication Data
US 2009/0063424 A1 Mar. 5, 2009

(30) Foreign Application Priority Data
Aug. 30, 2007 (JP) ................................. 2007-223789

(51) Int. Cl.
*G06F 7/00* (2006.01)
*G01C 21/12* (2006.01)
(52) U.S. Cl. ......................... 707/758; 707/919; 701/409
(58) Field of Classification Search .................. 707/758, 707/919, 999.001–999.003; 701/409
See application file for complete search history.

(56) References Cited

U.S. PATENT DOCUMENTS

| | | | | |
|---|---|---|---|---|
| 5,767,795 | A * | 6/1998 | Schaphorst | 340/988 |
| 5,857,199 | A * | 1/1999 | Tamano et al. | 707/797 |
| 6,032,157 | A * | 2/2000 | Tamano et al. | 707/999.003 |
| 6,389,356 | B1 * | 5/2002 | Onishi | 701/209 |
| 6,505,186 | B1 * | 1/2003 | Muro et al. | 707/770 |
| 7,162,405 | B2 * | 1/2007 | McCabe et al. | 703/17 |
| 7,185,021 | B2 * | 2/2007 | Kishigami | 1/1 |
| 7,249,006 | B2 * | 7/2007 | Lombardo et al. | 703/2 |
| 2003/0140056 | A1 * | 7/2003 | Wall et al. | 707/102 |
| 2003/0200192 | A1 * | 10/2003 | Bell et al. | 707/1 |
| 2004/0036688 | A1 * | 2/2004 | Cutlip | 345/440 |
| 2006/0047422 | A1 * | 3/2006 | Fukumi | 701/209 |
| 2007/0233375 | A1 * | 10/2007 | Garg et al. | 701/211 |

(Continued)

FOREIGN PATENT DOCUMENTS

| | | |
|---|---|---|
| JP | 2003-157287 | 5/2003 |
| JP | 2003-330360 | 11/2003 |

(Continued)

OTHER PUBLICATIONS

Halls, P.J., F.A.C. Polack and S.E.M. O'Keefe "A New Approach to the Spatial Analysis of Temporal Change Using Todes and Neural Nets", CyberGeo: European Journal of Geography, Sep. 3-7, 1999.*

(Continued)

*Primary Examiner* — Robert Timblin
(74) *Attorney, Agent, or Firm* — Antonelli, Terry, Stout & Kraus, LLP.

(57) ABSTRACT

Provided is a geographic information system using map data including configuration data provided with time information and attribute data corresponding to an attribute of an object contained in the map data, including an information import module for receiving an input of a geographic area of an object to be retrieved and a search key; a map retrieval module for extracting configuration data, for which the input geographic area of the object to be retrieved and an area represented by the configuration data at least partially overlap each other, from the map data; a correlation module for correlating the configuration data with the attribute data identical with the input search key, for which the area represented by the extracted configuration data overlaps the positional information, according to each of the time information provided to the configuration data and to the attribute data; and an output module for outputting the correlated data.

22 Claims, 15 Drawing Sheets

U.S. PATENT DOCUMENTS

2010/0054527 A1* 3/2010 Kirmse et al. ............... 382/100
2011/0007094 A1* 1/2011 Nash et al. ................... 345/634

FOREIGN PATENT DOCUMENTS

JP 2006-349520 12/2006

OTHER PUBLICATIONS

Wilson, A. "Sydney TimeMap: Integrating Historical Resources Using GIS", History and Computing, vol. 13, No. 1, pp. 45-68, 2001.*

Khairy, H. and A. Wanas "Toward an Architectural Heritage TimeMap", Proceedings of the First International Conference of the UIA-WPAHR-V on Architecture & Heritage as a Paradigm for Knowledge and Development Lessons of the Past, New Inventions and Future Challenges, Mar. 2-4, 2002.*

Gregory, I.N. and R.G. Healey "Historical GIS: Structuring, Mapping and Analysing Geographies of the Past", Progress in Human Geography, vol. 31, No. 5, pp. 638-653, 2007.*

Johnson, I. "Mapping the Fourth Dimension: A Ten Year Perspective", Archeologia e Calcolatori, vol. 19, pp. 31-43, 2008.* http://googleearthuser.blogspot.com/2006/11/historical-map-overlays.html.* http://web.archive.org/web/20060614140926/http://the-alamo-san-antonio.com/historical_map_alamo.htm.*

* cited by examiner

GEOGRAPHIC INFORMATION SYSTEM

CLAIM OF PRIORITY

The present application claims priority from Japanese patent applications JP 2007-223789 filed on Aug. 30, 2007, the content of which are hereby incorporated by reference into this application.

BACKGROUND OF THE INVENTION

This invention relates to a geographic information system, in particular, a geographic information management method which enables an object landmark to be found by referring to previous data even if the landmark has disappeared.

Conventionally, updating to the latest data is considered as being important in the management of map data of a geographic information system. Therefore, once map data is updated, old map data is discarded. For example, Japanese Patent Application Laid-Open No. 2003-330360 (hereinafter, referred to as Patent Document 1) discloses a method of managing buildings on a map and attribute data in time series. The disclosed method allows a configuration and attributes of a building at a designated specific time to be retrieved. However, when a time at which an object building existed is unknown, it is difficult to retrieve the object building over different periods of time.

Japanese Patent Application Laid-open No. 2003-157287 (hereinafter, referred to as Patent Document 2) discloses a method of relating a reference point added in a graphic with attribute data. When the attribute is modified, new attribute data is related with the reference point for which the attribute is modified. As in Patent Document 1 described above, it is still difficult to perform retrieval over different periods of time with this method.

SUMMARY OF THE INVENTION

In the related art described above, for checking a landmark (a building, a constructed structure or the like) by using the geographic information system, the landmark has sometimes disappeared from a map. In general, the map data used by the geographic information system is always updated to the latest one. Therefore, the configuration and attributes of a previously existing building are deleted in many cases. Thus, it is difficult to retrieve a previously existing landmark which is still in human memory. Actually, in urban areas in particular, buildings are transformed and replaced due to modifications in urban planning or the like.

Further, it is difficult to retrieve the attribute of a building without specifying a time. For example, tenants in a building change frequently. Although there is need to retrieve a tenant which existed in a specified period of time, the previous attribute data cannot be retrieved because the conventional geographic information system manages only the latest attribute data.

If the geographic information system stores the previous data, it is possible to retrieve a building which existed in a specific time period (for example, for the past one year from the latest time) and attributes of the building by using the stored previous data. However, it is still difficult to retrieve a building which existed in an unknown period of time.

A representative aspect of this invention is as follows. That is, there is provided a geographic information system using map data having configuration data provided with time information and attribute data corresponding to an attribute of an object contained in the map data, the attribute data being provided with positional information and time information, including a processor, a memory coupled to the processor, a communication interface coupled to the processor, and a user interface coupled to the processor; an information import module for receiving an input of a geographic area of an object to be retrieved and a search key; a map retrieval module for extracting configuration data, for which the input geographic area of the object to be retrieved and an area represented by the configuration data at least partially overlap each other, from the map data; a correlation module for correlating the configuration data with the attribute data identical with the input search key, for which the area represented by the extracted configuration data overlaps the positional information, according to the time information provided to the configuration data and the time information provided to the attribute data; and an output module for outputting the configuration data and the attribute data correlated with each other. This invention has an object of providing a geographic information system which can retrieve a building and a tenant which previously existed.

According to an embodiment of this invention, a previously existing building can be retrieved by using previous data.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

First, the schema of an embodiment of this invention will be described. In the embodiment of this invention, graphic configuration data of a previously existing building is not discarded but is stored with time information (time period of existence, specifically, start time and end time) being added thereto. When retrieval is performed with a configuration and/or an attribute, the previous graphic configuration and/or attribute are/is retrieved by referring to the time information in addition to the current graphic configuration and/or attribute to confirm the existence of the object building.

When retrieval is performed by designating a specific location (geographic area), the object building is not always contained in the latest data even if the retrieval is performed on the latest map and attributes. Further, the building does not always include the same tenants and residents. According to this embodiment, however, the configuration and the attributes are provided with the time information. By performing the retrieval over periods of time, desired building and attribute are retrieved.

For the above-mentioned purpose, the retrieval is performed with the designation of the geographic area. A history list is created based on the obtained result. The created history list contains a pointer (for example, address at which data is stored) to graphic configuration data, a pointer to attribute data, and the time information. Then, the retrieval is performed sequentially on the time information in the history list to find the desired object building and attribute. Then, when the data of the desired object building and attribute is found, information of the building which existed at a different point of time and its attributes can be presented as the result of retrieval to a user who performs the retrieval.

More specifically, a geographic information system according to the embodiment of this invention includes a map server computer for storing map data and attribute data managed in time series, and a client computer for transmitting a position coordinate and a name of a building desired to be retrieved. Each of the server computer and the client computer has a communication function through a wired and/or wireless network(s) such as the Internet. The client computer transmits the input position coordinate (geographic search area) and a search key (name) to the server computer to retrieve a configuration and the name of the building from a historical map database and a historical attribute database to acquire the result of retrieval from the server computer, and then displays the acquired result of retrieval.

Next, a configuration of the geographic information system according to the embodiment of this invention will be described.

Figure 1:
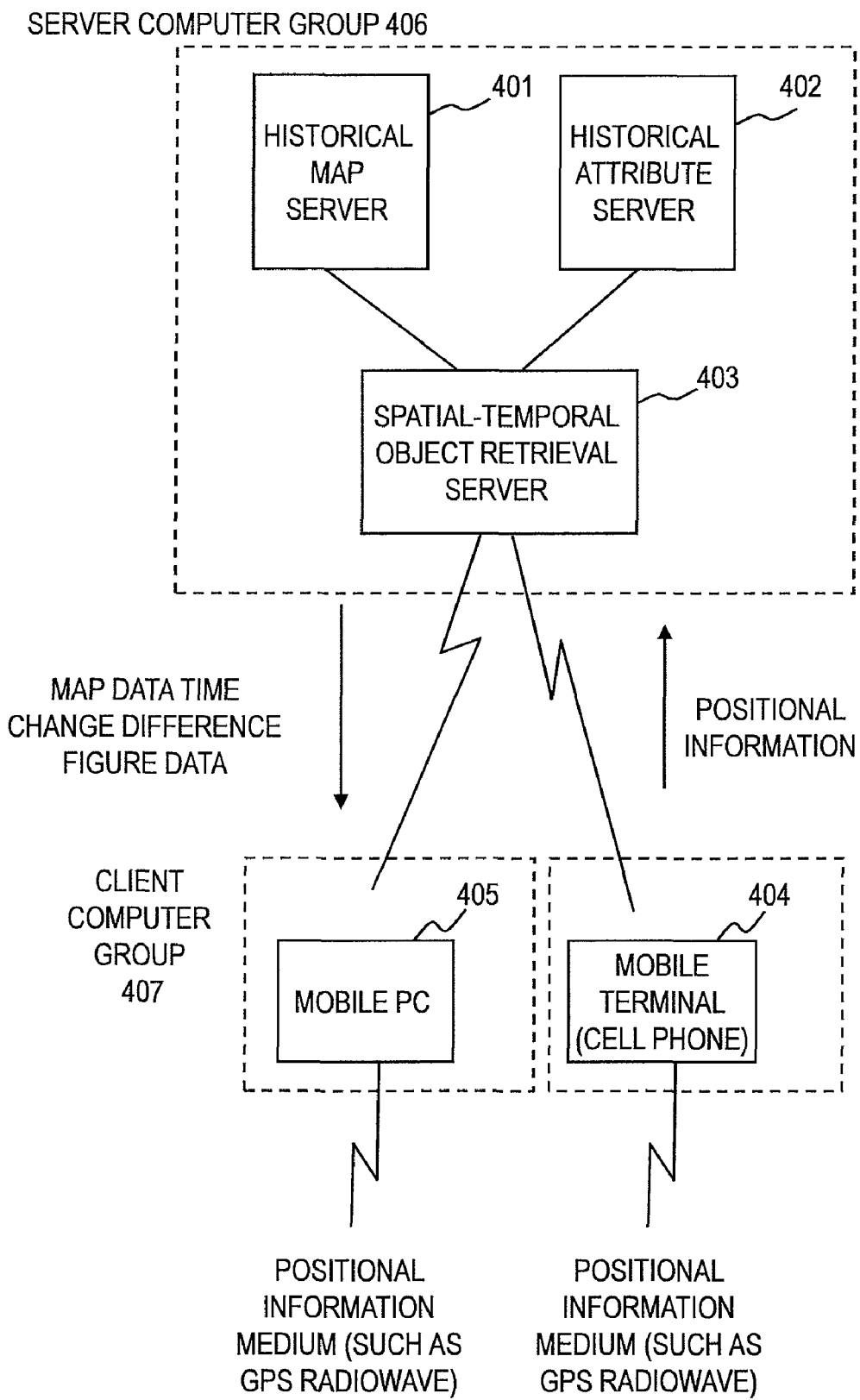
FIG. 1 is a block diagram illustrating the configuration of the geographic information system according to an embodiment of this invention.

FIG. 1 is a block diagram illustrating the configuration of the geographic information system according to the embodiment of this invention.

The geographic information system according to the embodiment of this invention includes a server computer group 406 and a client computer group 407.

The server computer group 406 includes a historical map server 401, a historical attribute server 402, and a spatial-temporal object retrieval server 403. The historical map server 401 stores a map database 101 and a region management database 102 containing a history (see FIG. 2). The historical attribute server 402 stores an attribute database 103 containing a history (see FIG. 2). The spatial-temporal object retrieval server 403 makes an access to the historical map server 401 and the historical attribute server 402 to perform retrieval of the map data and the attribute data backward in time from the present time to acquire predetermined object data.

Each of the servers is a computer including a processor, a memory, a communication interface, and a user interface. The processor executes a program stored in the memory to perform processing described below. For example, a retrieval function is implemented by software. The functions of the servers may be implemented by a plurality of computers (hardware) or by a single computer.

A user of the geographic information system uses a mobile terminal 404 such as a cell phone or a mobile personal computer (PC) 405 corresponding to a small mobile computer to inquire for map information or a name. Each of the client computers 404 and 405 includes a processor, a memory, a communication interface, a user interface, and position acquisition means (such as a global positioning system (GPS)). The processor executes a program stored in the memory to perform processing described below.

When positional information acquired by the GPS and name information which is desired to be retrieved are input to the client computer, the input information is transmitted through a wired and/or wireless communication line(s) to the spatial-temporal object retrieval server 403.

The spatial-temporal object retrieval server 403 refers to the region management database 102, the map database 101 and the attribute database 103 to retrieve a graphic configuration and a name of the building. Information on the graphic configuration and that on the name of the building retrieved by the spatial-temporal object retrieval server 403 are transmitted to the client computer through the communication line.

The information transmitted to the client computer is displayed on a screen of the client computer.

FIG. 1 illustrates the geographic information system having a server-client configuration as an example, but each of the functions of the historical map server 401, the historical attribute server 402 and the spatial-temporal object retrieval server 403, and the function of the mobile terminal 404 can be both implemented by a single terminal device to realize the mobile geographic information system according to the embodiment.

Further, even by implementing the function except for those of the historical map server 401 and the historical attribute server 402, that is, only the function of the spatial-temporal object retrieval server 403 in the mobile terminal 404, the geographic information system according to the embodiment can be realized. In this case, the mobile terminal 404 makes an access to the databases stored in the historical map server 401 and the historical attribute server 402 through the communication line to acquire the map data, the region data, and the attribute data.

Figure 2:
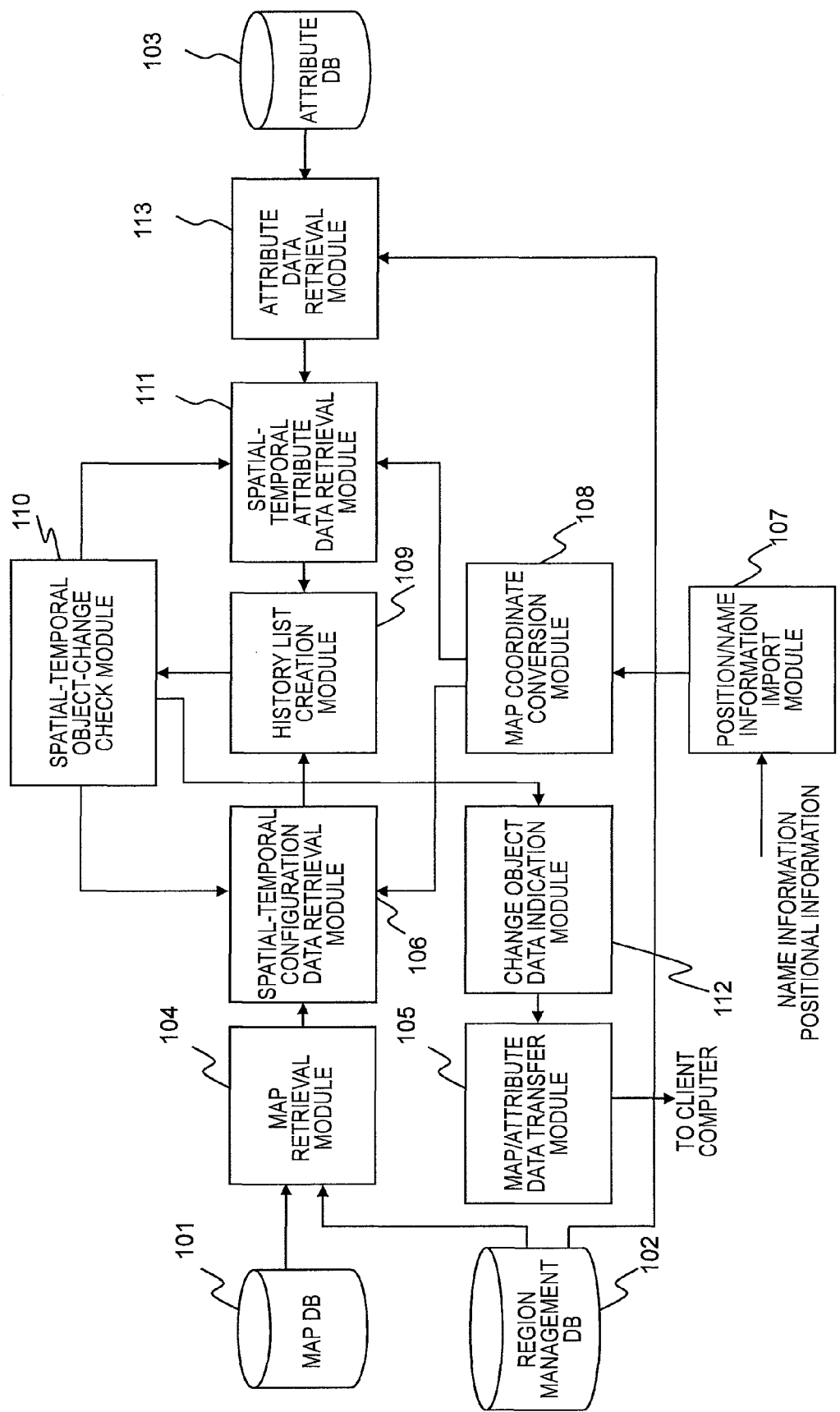
FIG. 2 is a functional block diagram of the geographic information system according to the embodiment of this invention.

FIG. 2 is a functional block diagram of the geographic information system according to the embodiment of this invention.

The geographic information system according to the embodiment includes the map database 101, the region management database 102, the attribute database 103, a map retrieval module 104, a map/attribute data transfer module 105, a spatial-temporal configuration data retrieval module 106, a position/name information import module 107, a map coordinate conversion module 108, a history list creation module 109, a spatial-temporal object-change check module 110, a spatial-temporal attribute data retrieval module 111, and a change object data indication module 112.

The historical map server 401 includes the map database 101 and the region management database 102. The historical attribute server 402 includes the attribute database 103. The spatial-temporal object retrieval server 403 includes the above-mentioned configurations from the map retrieval module 104 to the change object data indication module 112.

The map database (DB) 101 is a database for storing the historical map data including previous data. The map data includes graphic configuration data indicating a building and information on a time of existence of the building, and is stored in the map database 101 in a format 301 described below referring to FIG. 4.

The region management database (DB) 102 is a database for storing region data for relating one block area on a map, the map data, and the attribute data to each other. Specifically, coordinates of four corners of each map data are stored in the region management database 102 to provide information indicating which map includes a coordinate of interest, thereby providing an adjacency relationship of the maps. Specifically, by using the region management database 102, it is possible to know which block area map or the attribute data of which block area contains a certain point (coordinate).

The attribute database 103 stores attributes of a building (graphic configuration) included in the map data. The attribute data contains a name of the building (a name of a house, a tenant or the like) and positional information (for example, a coordinate of a reference point), and is associated with the graphic configuration data through the positional information. The attribute data is stored in the attribute database 103 in a format 302 described below referring to FIG. 4.

The map retrieval module 104 refers to the region data stored in the region management database 102 to read out map data of the block area to be referred to from the map database 101, and then, expands the read map data on the memory of the computer. The spatial-temporal configuration data retrieval module 106 performs retrieval on the graphic configuration data of buildings which currently exist or previously existed within a predetermined area. Specifically, the retrieval is performed backward in time on the graphic configuration data of the previously existing buildings.

The attribute data retrieval module 113 refers to the region data stored in the region management database 102 to read out the attribute data to be referred to from the attribute database 103, and then, expands the thus read attribute data on the memory of the computer. The spatial-temporal attribute data retrieval module 111 performs retrieval on the attribute data of buildings which currently exist or previously existed within the predetermined area. Specifically, the retrieval is performed backward in time on the attribute data of the previously existing buildings.

The position/name information import module 107 acquires the positional information (coordinate of a position) from a position measurement device such as the global positioning system (GPS) to acquire a name serving as a search key of the attribute. Those acquired pieces of information are transmitted from the client computer through the wireless communication line. The positional information acquired by the GPS is compliant with a world coordinate system. The map coordinate conversion module 108 converts a coordinate compliant with the world coordinate system, which is used by the GPS, into a coordinate system of the map stored in the map database 101 as needed.

The history list creation module 109 contains the graphic configuration data retrieved by the spatial-temporal configuration data retrieval module 106 and the attribute data retrieved by the spatial-temporal attribute data retrieval module 111 to create a history list obtained by arranging those retrieved pieces of data according to the time information.

The spatial-temporal object-change check module 110 selects data relating to the designated name from the graphic configuration data retrieved by the spatial-temporal configuration data retrieval module 106 in a geographic search area and the attribute data retrieved by the spatial-temporal attribute data retrieval module 111.

The change object data indication module 112 extracts the graphic configuration data and the attribute data, which satisfy the retrieval conditions, from the history list created by the history list creation module 109, and then, converts the extracted attribute data into a format allowing data exchange between devices, such as an extensible markup language (XML). The map/attribute data transfer module 105 transmits the retrieved graphic configuration data or attribute data to the client computer.

The geographic information system according to the embodiment of this invention checks a present location and the map against each other to allow its own location (the location of the user, the client computer or the like) to be recognized by using the map. In particular, in a navigation system, the use of the map allows the location to be specified, and further, allows a specific target object to be specified from its own present location.

However, even if name information (for example, name) of a building serving as a target object is transmitted, it sometimes happens that the building having the name does not actually exist because the building or the tenant is replaced by another one. In many cases, the replacement of the building or the tenant is due to redevelopment in an urban area or tenant change. However, even if the object to be retrieved does not actually exist, the users of the navigation system still desire to retrieve a building which does not currently exist. In such a case, the name of the building serving as the search key is based on human memory for the existence of the building. In this embodiment, the building is retrieved by using the previous attribute based on the human memory as described above as the search key.

For example, it sometimes happens that a plurality of buildings which existed at a certain point of time is grouped and renovated as one building. Further, the size of each block area is sometimes changed as a result of urban planning. The aging of a building sometimes changes the building structure. Such circumstances will be described below.

Figure 3A:
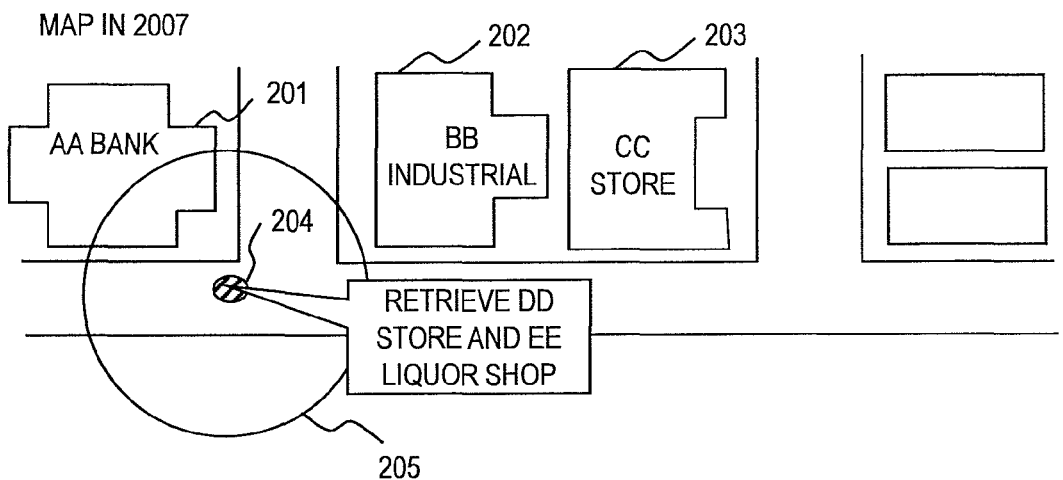
FIG. 3A is an illustrative view for spatial-temporal check of a position using a history map according to the embodiment of this invention.
Figure 3B:
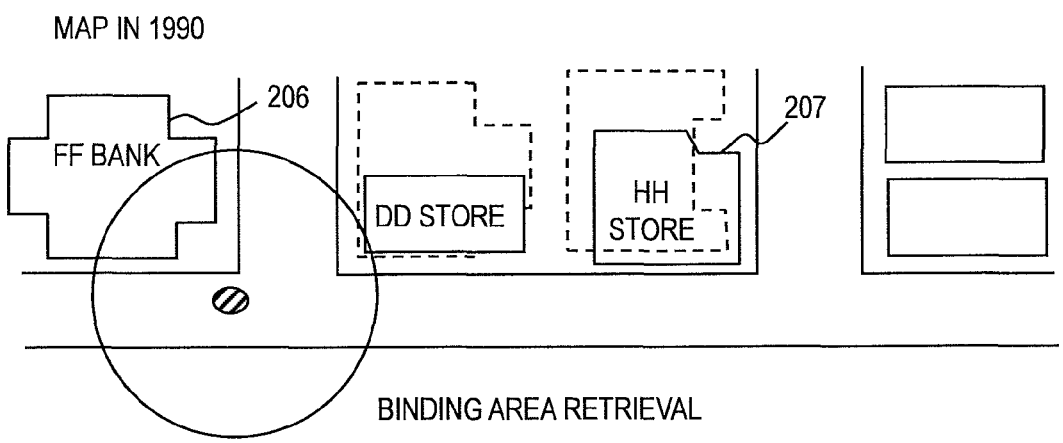
FIG. 3B is an illustrative view for spatial-temporal check of a position using a history map according to the embodiment of this invention.
Figure 3C:
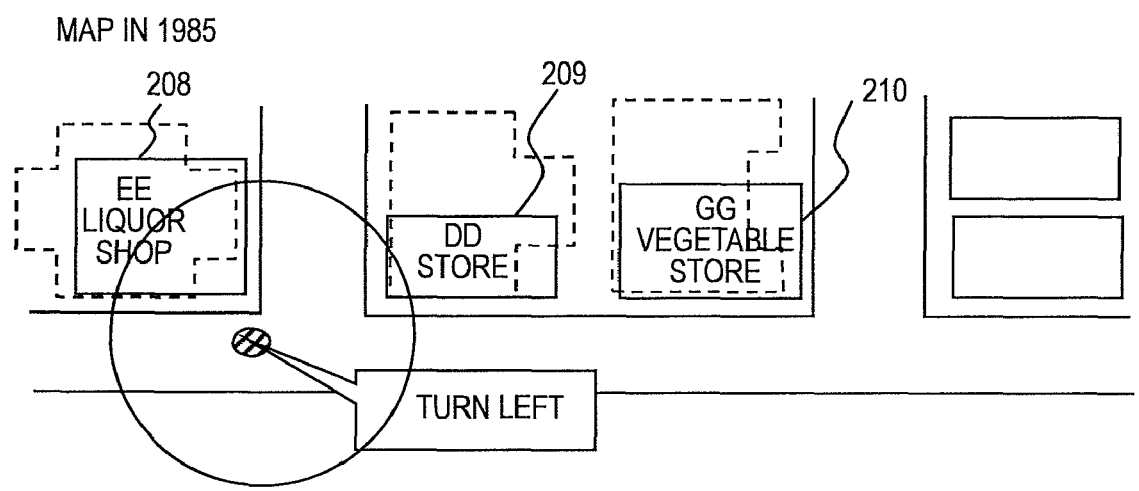
FIG. 3C is an illustrative view for spatial-temporal check of a position using a history map according to the embodiment of this invention.

FIGS. 3A to 3C are illustrative views for spatial-temporal check of a position using a history map. FIG. 3A shows the latest map (in 2007), FIG. 3B shows a map in 1990, and FIG. 3C shows the oldest map (in 1985).

As illustrated, with elapse of time, a configuration and a name of a building are shown on the map change. On the map in 2007 (FIG. 3A), a configuration of a building of an "HH store" 207 shown on the map in 1999 (FIG. 3B) has changed (the building is replaced by another one). In addition, the store name has been changed to a "CC store" 203. Further, according to the map in 1985 (FIG. 3C), a "GG vegetable store" 210 existed at this location.

An "EE liquor shop" 208 shown on the map in 1985 (FIG. 3C) is replaced by an "FF bank" 206 on the map in 1990 (FIG. 3B). The "FF bank" 206 in 1990 (FIG. 3B) is replaced by an "AA bank" on the map in 2007 (FIG. 3A), and has a different name.

A "DD store" 209 on the map in 1985 is replaced by a "BB Industrial" 202 on the map in 2007.

Such changes of the configurations and the names of the buildings described above inevitably occur. However, a geographic information system which does not have an elapsed time management function cannot manage the previous map data. Therefore, the configuration or the name of the building which previously existed cannot be checked. Besides, the buildings, the building names, and the tenant names do not change at a time for one area. Therefore, if the changes of the configurations and/or the names of the buildings are managed at each time period, the amount of data for the whole map becomes extremely large. Moreover, the retrieval of a specific building takes a long time because it takes a long time to read out the data.

Thus, in order to enable the retrieval by the configuration and/or the name of the previously existing building, it is necessary to manage only changes of establishments with elapse of time by the geographic information system. Hereinafter, a data management method will be described.

Figure 4:
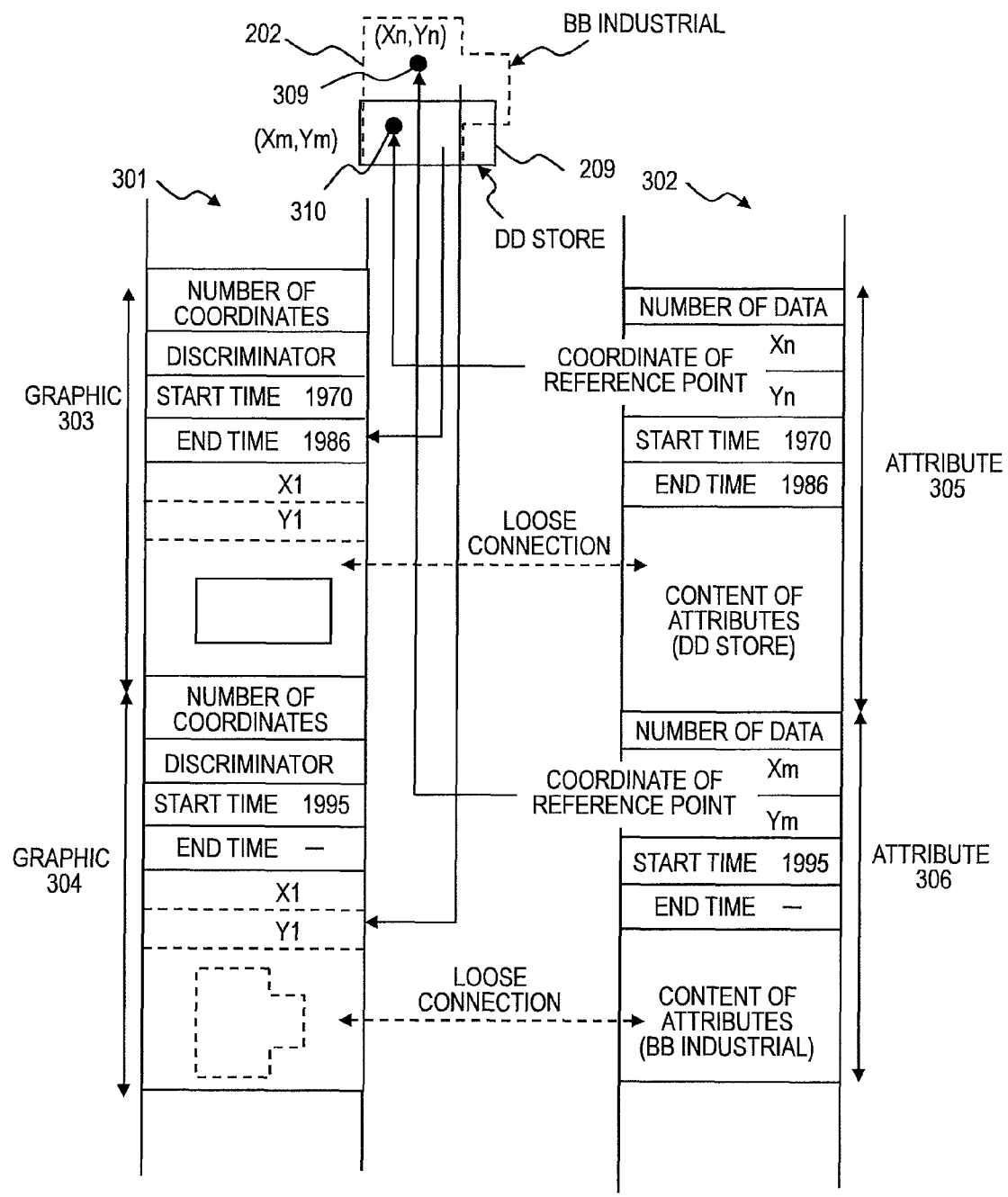
FIG. 4 is an illustrative view for a time history management method according to the embodiment of this invention.

First, a time history management method will be described. As illustrated in FIG. 4, the graphic configuration data is stored in a graphic data table 301 described by a coordinate sequence, whereas the attribute data is stored in an attribute data table 302. The graphic configuration data and the attribute data are generally stored in different tables. In FIG. 4, an example of the "BB Industrial" 202 and the "DD store" 209 is shown. The "BB Industrial" 202 and the "DD store" 209 did not exist at the same time period. The graphic configuration of the "DD store" 209 corresponds to graphic data 303, whereas the graphic configuration of the "BB Industrial" 202 corresponds to graphic data 304. The name "DD store" is attribute data 305 of the graphic configuration 307, whereas the name "BB Industrial" is attribute data 306 of the graphic configuration 202.

The graphic configuration data stored in the graphic data table 301 includes graphic configuration data including the number of coordinates indicating the number of coordinates constituting the graphic, a discriminator indicating the type of a building or road (for example, a predetermined number), a start time and an end time which indicate a time range of existence of the object, and real coordinates of a plurality of points constituting the graphic ((X, Y) in the case of a two-dimensional coordinate, and (X, Y, Z) in the case of a three-dimensional coordinate).

The attribute data stored in the attribute data table 302 contains the number of pieces of data indicating the size of an attribute data set, a coordinate of a reference point which represents the graphic, a start time and an end time which indicate a time range in which the attributes are valid, and a content of the attribute data. The reference point is set to be present in or on the graphic configuration data. In this manner, the attribute data and the graphic configuration data are associated with each other. In FIG. 4, the reference point of the graphic configuration 202 is a point 309, whereas the reference point of the graphic configuration 209 is a point 310.

Since each of the graphic configuration data and the attribute data contains the start time and end time data, a time period in which the data is valid can be specified. Further, when the graphic configurations are present in the same geographic area, the data can be stored in the same data table. As a result, the graphic configurations 307 and 308 are the buildings which overlap each other in the same area, but the data can be appropriately managed.

By using the data structure as described above, the data can be checked not only spatially but also temporally (spatial-temporal check).

An example will be described referring to FIG. 3A. When the user remembers that the "EE liquor shop" was around a specific location (for example, the present location) 204 and it was necessary to turn at the intersection near the "EE liquor shop" to get to a destination, the user at the specific location 204 tries to retrieve the "EE liquor shop". On the latest map in 2007 (FIG. 3A), the AA bank 201 exists at the location where the "EE liquor shop" existed.

When a binding area retrieval for retrieving buildings in a predetermined area (search area) 205 around the specific location 204 is performed, the "AA bank" 201 is retrieved while the "EE liquor shop" is not retrieved. This is because the "EE liquor shop" is not contained in the latest map data. However, the retrieval of the configuration is performed backward in time even on the configurations having the previous time attributes. Specifically, the retrieval is performed backward in time on the contents of the attribute data while referring to the start time attribute and the end time attribute contained in each of the graphic configuration data 303 and 304. As a result, the "EE liquor shop" 208 can be retrieved to specify the intersection at which the user should turn.

Even when the tenant in the building is replaced by another one, appropriate information can be obtained by the same retrieval. Specifically, the retrieval is performed on the contents of the attribute data by using a name of the tenant which seems to have existed as a key. For example, in FIG. 3A, an operator (user) remembers that the "FF bank" existed and inputs the name "FF bank". However, the "FF bank" is now replaced by the "AA bank". Therefore, even if the graphic configuration data corresponding to the "AA bank" 201 is retrieved by using the search area 205 to retrieve the attribute data based on the reference point contained in the graphic configuration, only the name "AA bank" can be found.

However, by managing the attribute data including the data of the time period of existence of the attributes, the retrieval of the "FF bank" 206 can be performed backward in time. Specifically, the building having the graphic configuration which overlaps the search area 205 is retrieved backward in time.

As in the case of the tenant name, it is preferred that information of a signboard on the building be stored as the attribute data. In this manner, the retrieval can also be performed based on a content described on the signboard.

Next, a history map retrieval method according to the embodiment of this invention will be described.

Figure 5:
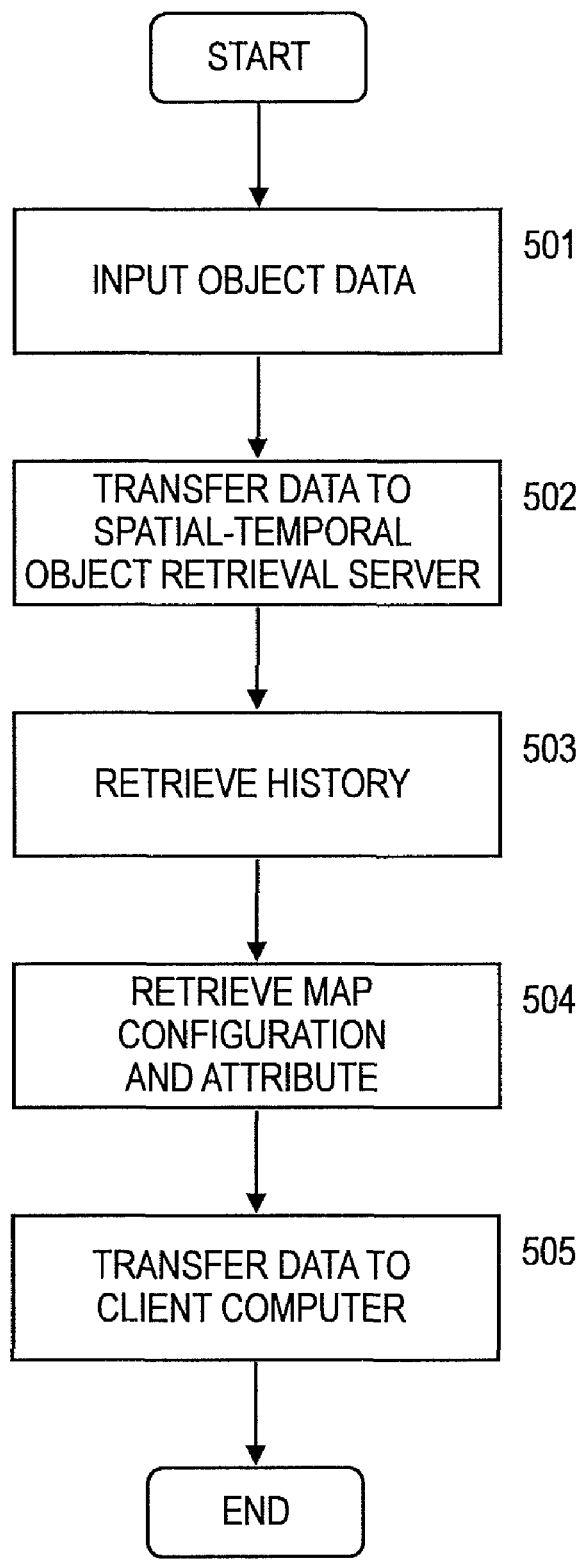
FIG. 5 is a flowchart showing the schema of the history map retrieval method by the geographic information system according to the embodiment of this invention.

FIG. 5 is a flowchart showing the schema of the history map retrieval method by the geographic information system according to this invention.

First, the client computer (the mobile terminal 404 or the mobile PC 405) acquires a name and a position of an object to be retrieved. For the acquisition of the position, a position coordinate may be acquired by the GPS or the like (Step 501). The client computer transfers data of the acquired name and position to the spatial-temporal object retrieval server 403 (Step 502).

Upon reception of the data of the name and the position of the object to be retrieved from the client computer, the spatial-temporal object retrieval server 403 makes an access to the historical map server 401 and the historical attribute server 402 to start the retrieval on the map data and the attribute data by using the transferred position data.

The historical map server 401 performs the retrieval on the history map data in the area (the search area 205 in FIGS. 3A to 3C) determined based on the designated position (denoted by 204 in FIGS. 3A to 3C). The historical attribute server 402 performs the retrieval on the history attribute data in the area determined based on the designated position. The spatial-temporal object retrieval server 403 specifies the graphic configuration data contained in the history map and the attribute data contained in the history attributes, correlates the specified graphic configuration data and attribute data with each other through the time, and sorts pointers (for example, memory addresses for accessing the data) to the correlated graphic configuration data and attribute data in order of time in the form of a list to create a history list 615 (FIG. 9) (Step 503).

Next, the spatial-temporal object retrieval server 403 sequentially checks the data contained in the created history list 615 from the latest graphic configuration data and attribute data to select the attribute data identical with the name input as the object to be retrieved and the graphic configuration data corresponding to the attribute data (Step 504).

Next, the spatial-temporal object retrieval server 403 transfers the selected attribute data and graphic configuration data to the client computer. The client computer displays the data transferred from the spatial-temporal object retrieval server 403 (Step 505).

Figure 6:
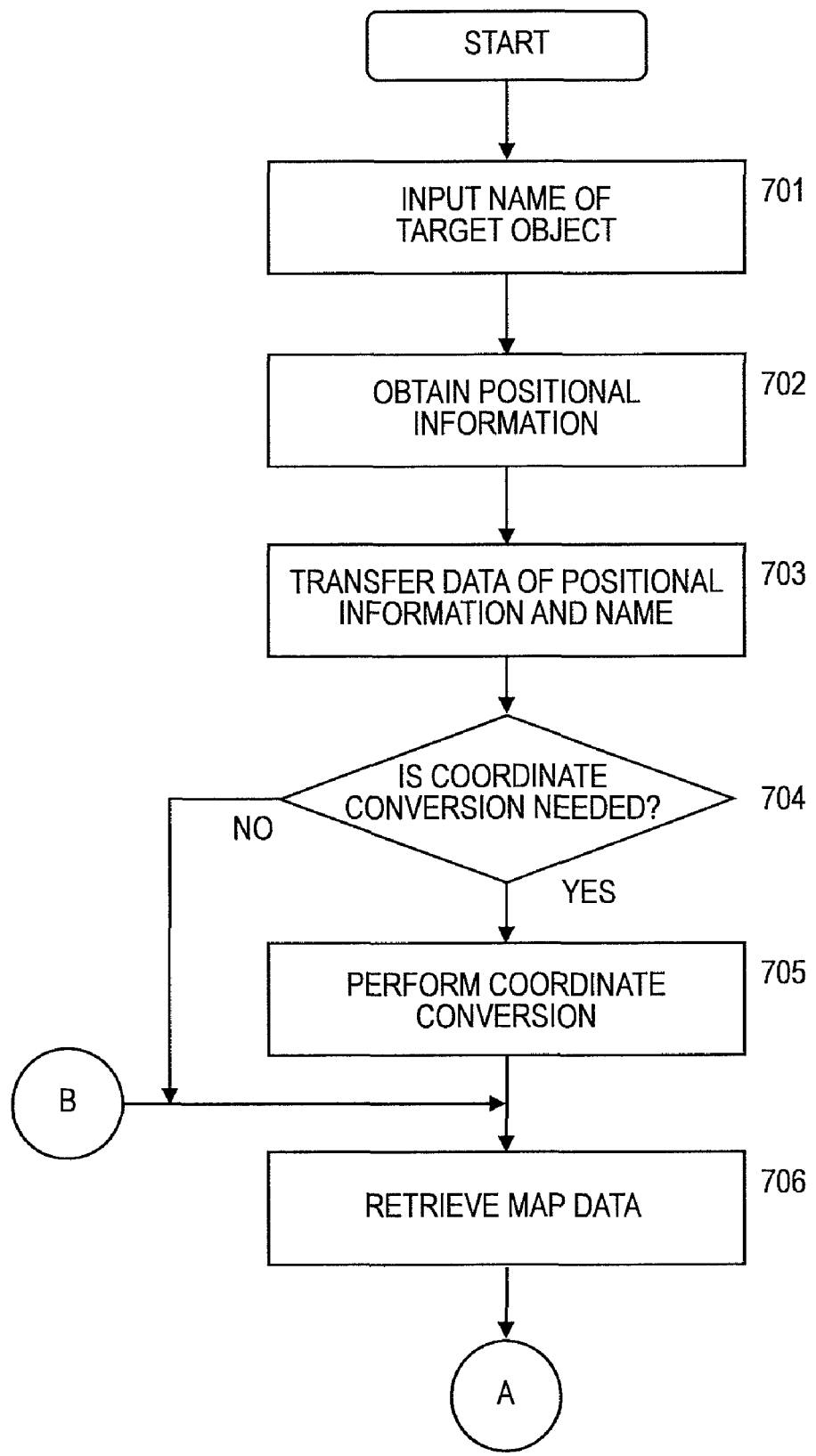
FIG. 6 is a flowchart showing the detail of the history map retrieval method by the geographic information system according to the embodiment of this invention.
Figure 7:
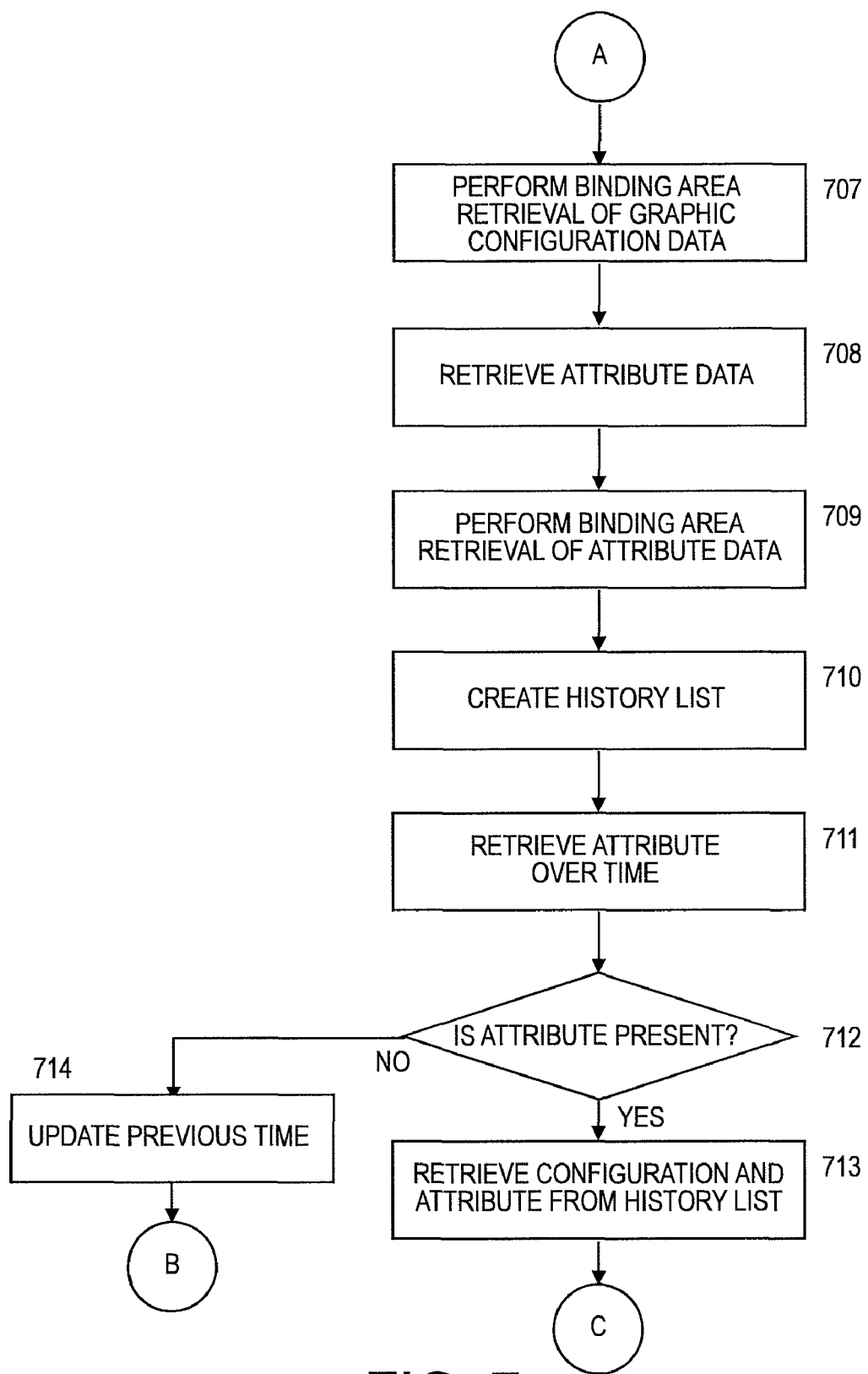
FIG. 7 is a flowchart showing the detail of the history map retrieval method by the geographic information system according to the embodiment of this invention.
Figure 8:
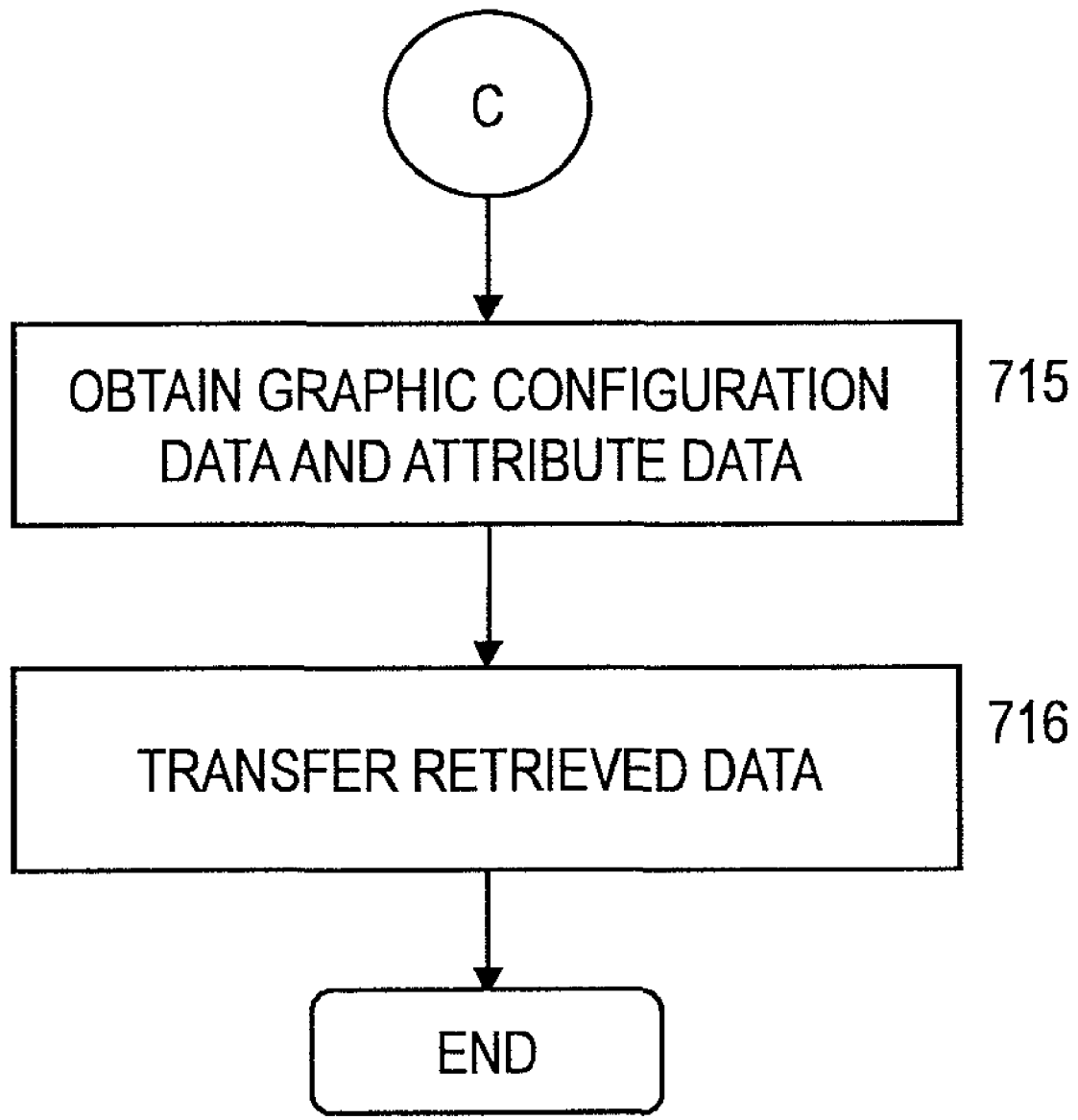
FIG. 8 is a flowchart showing the detail of the history map retrieval method by the geographic information system according to the embodiment of this invention.

FIGS. 6 to 8 are flowcharts, each illustrating the details of the history map retrieval method by the geographic information system according to the embodiment of this invention.

The user inputs a name of an object to be retrieved to the client computer (mobile terminal 404 or mobile PC 405) (Step 701).

The client computer can measure its own position (the position of the client computer) by using the positional information acquisition device such as the GPS or the like. By using the GPS, the position of the client computer on the earth can be measured wherever the client computer is. Besides the GPS, a gyro sensor or a speed sensor may be used as the positional information acquisition device. When none of the positional information acquisition devices can be used, a positional information acquisition device for inputting information such as an address designated by the user on the map, a name or the like may be used (Step 702).

Thereafter, the client computer transfers the name input in Step 701 and the positional information acquired in Step 702 to the spatial-temporal object retrieval server 403 (Step 703). These pieces of information are transmitted to the spatial-temporal object retrieval server 403 included in the server computer group 406 through the communication line such as the wireless communication line.

When the position/name information import module 107 of the spatial-temporal object retrieval server 403 receives the transferred name and positional information, the map coordinate conversion module 108 determines whether or not a coordinate system, with which the transferred positional information is compliant, is required to be converted (Step 704). For the determination in this step, when the coordinate system of the map data stored in the historical map server 401 is different from the world coordinate system used by the GPS, it is determined that the coordinate system is required to be converted. Then, the coordinate system of the transferred positional information is converted (Step 705). On the other hand, when the coordinate system is not required to be converted, the process proceeds to Step 706.

In Step 705, the coordinate is converted. For example, the world coordinate system by the GPS is converted into the Japanese coordinate system. A known method can be used for the coordinate conversion.

Next, the map retrieval module 104 accesses the map database 101 to acquire the map data containing the designated range. The range of the map data stored in the historical map server 401 is managed by the region data stored in the region management database 102.

The search area 205 is determined based on the position coordinate (specific location) 204 designated in Step 701. For example, the search area 205 can be determined by a circle around the designated position coordinate 204. A parameter (radius of the circle) indicating the range of the search area is determined in advance. One or a plurality of pieces of map data including the search area 205 is/are acquired.

Next, the map data overlapping the search area 205 is specified by referring to the region data to read out the map data overlapping the search area 205 (Step 706). The map data includes the graphic configuration data including the time information (start time and end time) as represented by the graphics 303 and 304 shown in FIG. 4.

Next, the spatial-temporal configuration data retrieval module 106 retrieves the graphic configuration data overlapping the search area 205 from the map data read out in Step 706 (Step 707).

Figure 9:
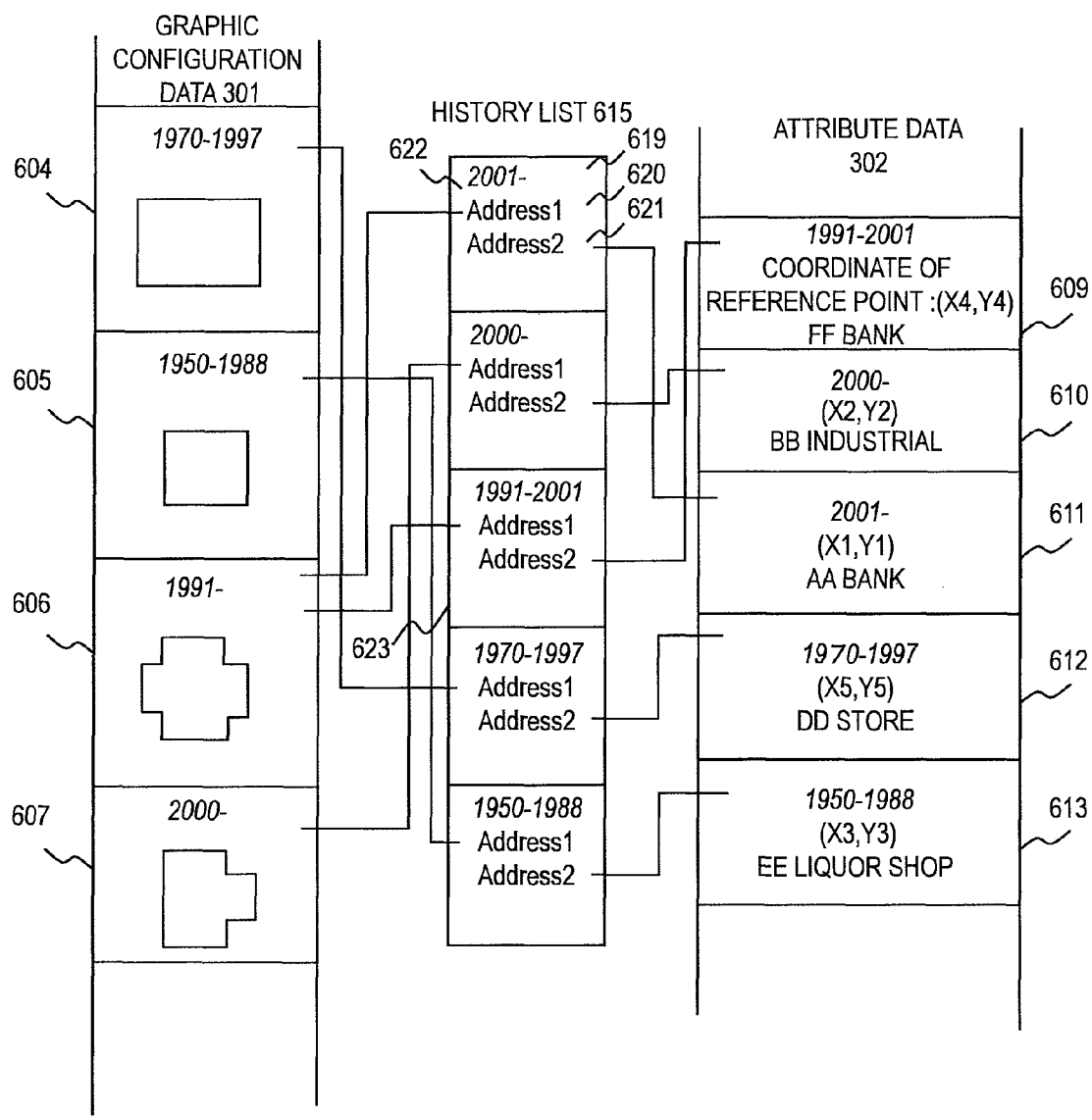
FIG. 9 is a diagram for illustrating a structure of the history list according to the embodiment of this invention.

The map data read out in Step 706 includes the coordinate of the reference point of each of the graphic configurations ((X1, Y1) to (X5, Y5) shown in FIG. 9). The attribute data retrieval module 113 makes an access to the attribute database 103 to acquire the attribute data corresponding to the reference point.

The range of the attribute data stored in the historical attribute server 402 is managed by the region data stored in the region management database 102 as in the case of the map data. Therefore, the map data overlapping the search area 205 is specified by referring to the region data to read out the attribute data corresponding to the specified map data (Step 708). The attribute data includes the attribute data including the time information (start time and end time) as represented by the attributes 305 and 306 shown in FIG. 4.

Next, the spatial-temporal attribute data retrieval module 111 checks whether or not the coordinate of the reference point of the attribute data retrieved in Step 708 is contained in the graphic configuration data acquired in Step 707. If there is any reference point contained in the graphic configuration data, it is determined the graphic configuration data and the attribute data correspond to each other. Then, pointers (addresses) to the graphic configuration data and the attribute data are acquired (Step 709).

Next, the history list creation module 109 refers to the time data included in the graphic configuration data retrieved by the spatial-temporal configuration data retrieval module 106 in Step 707 and the time data included in the attribute data retrieved by the spatial-temporal attribute data retrieval module 111 in Step 709 to rearrange the time data from that having the latest end time to create a history list 615 (Step 710).

As illustrated in FIG. 9, the history list 615 contains at least one data set. Specifically, one data set contained in the history list 615 includes start time/end time 619, a pointer 620 to the graphic configuration data in the time period indicated by the start time and the end time, and a pointer 621 to the attribute data. As each of the pointer 620 to the graphic configuration data and the pointer 621 to the attribute data, an address at which each data is stored may be used. Instead of the pointer to each data, the data itself may be contained in the history list 615.

Then, the data sets contained in the history list 615 are rearranged in the order of end times closer to the present time. The name of the object to be retrieved and the attribute data are checked according to the pointer 621 to the attribute data in order of rearrangement of the data sets (order of data sets closer to the present time). The reason for the sorting in order of time as described above is as follows. Since human memory fades as the time goes by back from the latest time, the previous data closer to the present time is checked by priority to quickly find the object to be retrieved.

Next, the spatial-temporal object-change check module 110 uses the history list 615 created in Step 710 to retrieve the name data to be retrieved (Step 711). The name is retrieved by tracing back the pointer (address 2) to the attribute data (specifically, reading out the attribute data stored at the address 2 in the attribute database 103) to check the name data and the attribute data. As a result, when the name data of the object to be retrieved is found, the process proceeds to Step 713. On the other hand, the name of the object to be retrieved is not found, the process proceeds to Step 714 (Step 712).

In Step 714, the history list creation module 109 changes a retrieval time period. For example, when the retrieval time period is set to 5 years, the time range from the present time to five years ago is first retrieved. However, if the attribute data is not included in the range, the time goes back another five years to perform the retrieval on the time range from five years ago to ten years ago. Therefore, the process after Step 706 is executed for a newly determined time period.

On the other hand, when the attribute data identical with the name is present in Step 713, the spatial-temporal object-change check module 110 reads out the graphic configuration data corresponding to the attribute data. For the graphic configuration data, the pointer (address 1) 620 to the graphic configuration data is traced back to read out the data stored at the address 1 in the map database 101 (Step 713). The spatial-temporal object-change check module 110 refers to the address 620 to the graphic configuration data contained in the history list 615 and the address 621 to the attribute data to specify the graphic configuration data and the attribute data. From a data set 622 in the history list 615, the graphic configuration data 606 and the attribute data 611 are specified. Then, each of the specified data is read out.

Thereafter, the change object data indication module 112 extracts the graphic configuration data and the attribute data read out in Step 713 to convert the extracted data into a format for transferring the data (for example, the XML format) (Step 715).

The graphic configuration data and the attribute data in the converted data format are transmitted to the client computer via the map/attribute output module 105 (Step 716). The transmission of the coordinate of the reference point of the attribute data enables the display of the position of the building provided with the attribute data.

In the manner as described above, the name data and the configuration data retrieved even in consideration of the time history are displayed.

Next, the details of a method of creating the history list 615 will be described. FIG. 9 is a diagram for illustrating a structure of the history list 615 and the method of creating the history list 615.

As described above, the graphic configuration data and the attribute data are correlated with each other to be stored in the history list 615.

When a building around the present location 204 is to be retrieved, the search area 205 is first set based on the present location 204 (Step 706). Further, in Step 706, graphic configuration data 604 to 607 overlapping the search area 205 are retrieved from the graphic configuration database 301.

Moreover, in Step 708, attribute data 609 to 613 are retrieved from the attribute data table 302. In Step 708, the attribute data other than the attribute data 609 to 613 is also retrieved. However, the attribute data other than the attribute data 609 to 613 is discarded because the coordinate of the reference point is not contained in the graphic configuration data in Step 709. Therefore, the illustration thereof is herein omitted.

Retrieved graphic configurations 615, 616, 617 and 618 respectively correspond to the graphic configuration data 606, 605, 607 and 604. The names "AA bank", "FF bank", "EE liquor shop", "BB Industrial" and "DD store" respectively correspond to the attribute data 611, 609, 613, 610 and 612.

Next, in Step 709, the coordinate of the reference point of the attribute data is checked whether or not the coordinate is contained in the graphic configuration data. The attribute data is correlated with the graphic configuration data through the time information and the coordinate of the reference point. Since the coordinate of the reference point is placed in the structure data or on an outline of the graphic, the configuration data and the attribute data can be correlated with each other.

For example, the attribute data "FF bank" 609 can be correlated with the graphic configuration data 606 because the coordinate (X2,Y2) of the attribute data is contained in the graphic configuration data 606.

Moreover, a plurality of pieces of graphic configuration data related with the same point of a coordinate and a plurality of pieces of the attribute data related with the graphic configuration data can be uniquely correlated through the time information (the start time and the end time). Specifically, one data set is created for the time period in which any of the graphic configuration data and the attribute data does not change. The graphic configuration data corresponding to the attribute data "AA bank" 611 is the same as the graphic configuration data corresponding to the attribute data "FF bank" 609. Therefore, the data sets 622 and 623 in the history list 615 have the common pointer (address 1) to the graphic configuration data.

Alternatively, instead of using the time information as it is, the time information may also be referred to at predetermined time intervals to correlate the graphic configuration data and the attribute data with each other. For example, the graphic configuration data and the attribute data are referred to in a unit of one year to be correlated with each other. Specifically, only a year of the time information is referred to while a month and a day of the time information are neglected.

The configuration (graphic configuration data) and the attribute data of the building do not always change at the same timing due to a difference in timing of change and a difference in timing of collecting the data. Therefore, by referring to the graphic configuration data and the attribute data at predetermined time intervals as described above, the amount of computation for correlating the graphic configuration data and the attribute data with each other can be reduced.

For storing the data in the history list 615, the time information of the attribute data correlated with the graphic configuration data is first referred to. Then, the attribute data falling within a predetermined time period (for example, five years back from the present time) is selected. Then, the selected attribute data is sorted in order of the end times closer to the present time. Then, in order of the sorted time, the pointer (address 1) to the graphic configuration data and the pointer (address 2) to the attribute data are correlated with each other, and then, are stored in the history list 615 in a correlated manner.

If the attribute data correlated with the graphic configuration data is not present in the predetermined time period, a new time period further back to the past is determined to select the attribute data in the newly determined time period.

Whether or not the reference point of the attribute data is encompassed in the graphic configuration data can be specifically determined by the following calculation. First, a rectangle circumscribed to the graphic configuration data is obtained. Then, it is checked whether or not the reference point is contained in the obtained circumscribed rectangle. When the reference point is not contained in the circumscribed rectangle, the reference point is not present in the graphic configuration data.

Moreover, a line is extended from the reference point in parallel to a coordinate axis to calculate the number of intersections between the line and the graphic configuration data. As a result, whether or not the reference point is encompassed in the graphic configuration can be determined. For example, the number of intersections between the extended line and the graphic configuration data is odd, it is determined that the reference point is encompassed in the graphic configuration. On the other hand, the number of intersections between the extended line and the graphic configuration data is even, it is determined that the reference point is present out of the graphic configuration.

Figure 10:
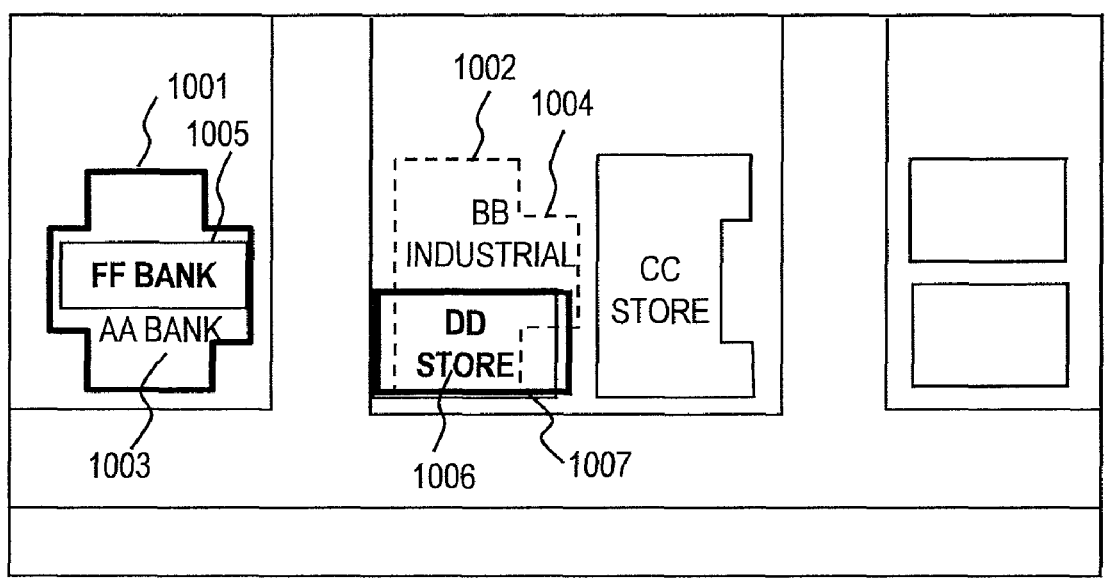
FIG. 10 is an illustrative diagram showing an example of a map according to the embodiment of this invention.

For displaying the graphic configuration data and the name data, the previous data can be displayed in an overlapping manner. FIG. 10 shows an example where the previous graphic configuration data and name data and the current graphic configuration data and name data are displayed in an overlapping manner.

FIG. 10 shows the example where the "FF bank" and the "DD store" are input. The graphic configuration of the "FF bank" is the same as the graphic configuration of the existing "AA bank". However, since the name of the building has been changed to the current name "AA bank", graphic configuration data 1001 is displayed with a thick line and the name "FF bank" is displayed in a frame. In this manner, the data found by the retrieval is displayed in an emphasized manner. On the other hand, the current name "AA bank" 1003 is displayed without emphasis.

Graphic configuration data 1007 of the "DD store" is displayed with a thick line, and the name "DD store" 1006 is displayed in a frame. In this manner, the data of the "DD store" is displayed in an emphasized manner.

On the other hand, previous graphic configuration data 1002 is displayed with a different type of line such as a dot line, whereas a previous name "BB Industrial" 1004 is displayed without emphasis. Since the previous graphic configuration data is also displayed, the overlap of the configurations present at the same location at different times is required to be calculated. The overlap of the graphic configurations can be easily calculated by obtaining a rectangle circumscribed to the graphic configuration data and then determining whether or not sides of the circumscribed rectangle intersect each other.

By displaying the previous graphic configuration data and name data and the current graphic configuration data and name data in an overlapping manner as described above, the user can easily correlate the current map and the previous name with each other.

Figure 11A:
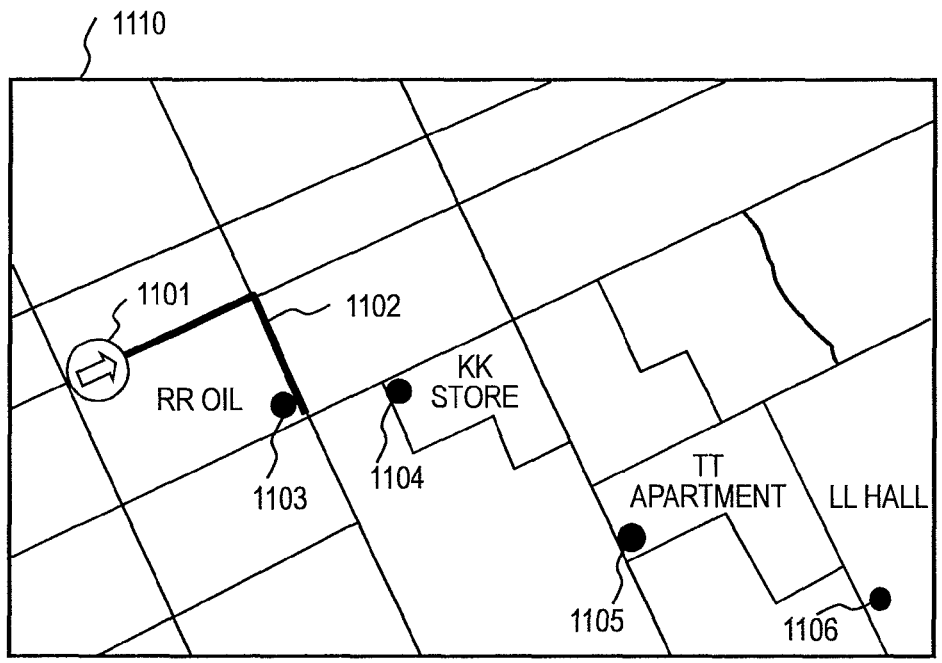
FIG. 11A is an illustrative diagram showing an example of a path search module according to the embodiment of this invention.
Figure 11B:
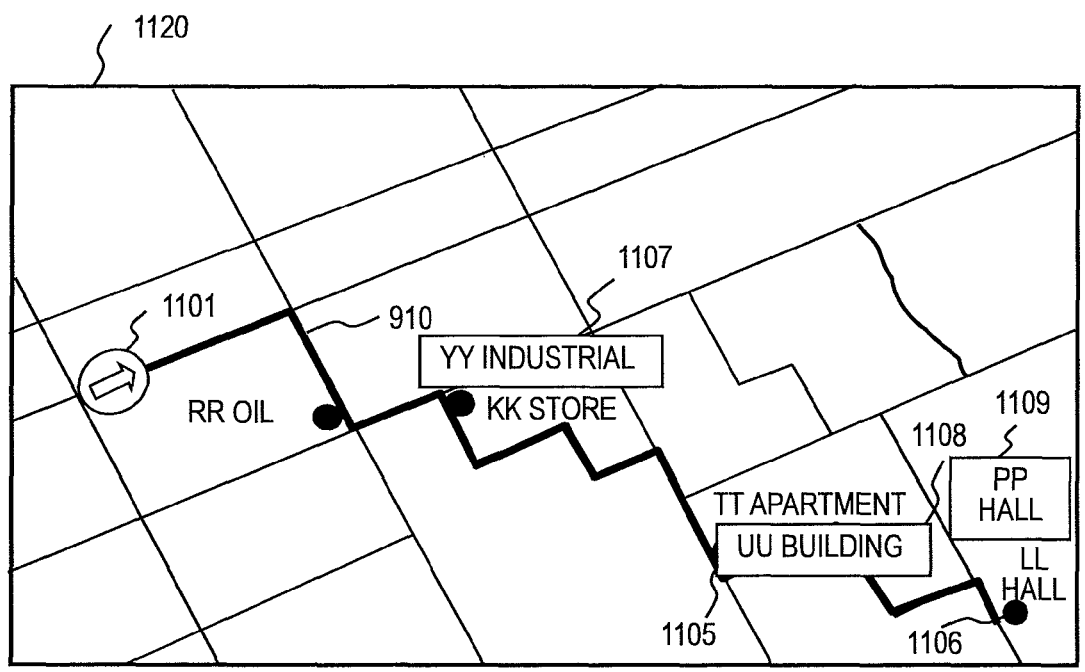
FIG. 11B is an illustrative diagram showing an example of a path search module according to the embodiment of this invention.

Next, an example where the history map retrieval according to this invention is applied to a path search used for the car navigation system or the like will be described. FIG. 11A shows a current map 1110 in the car navigation system, whereas FIG. 11B shows a previous map 1120.

For searching for a path, a destination and a stopping point are input. In some cases, the destination and the stopping point no longer exist or the name has changed. Therefore, it is necessary to perform the retrieval on the history of the destination and the stopping point.

The car navigation system searches for a path from a present location 1101 through an "RR Oil", a "YY Industrial" and a "UU building" to a destination a "PP hall". The latest map data includes the "RR Oil", but the latest map data does not include the "YY Industrial.", the "UU building, and the "PP hall". Therefore, the navigation system can only search for a path from the present location 1101 to the "RR Oil" 1103. Specifically, since the input stopping point and destination do not exist on the way ahead of the "RR Oil" 1103, the path to the "PP hall" cannot be found by the search.

As described above, an appropriate path cannot be guided in the conventional car navigation system. With the history map retrieval according to this invention, however, an appropriate path can be searched.

Specifically, by using the history map retrieval method described above, the previous existence of the "YY Industrial" 1107 at the position where the "KK store" 1104 currently exists can be retrieved by referring to the previous map data and attribute data. The previous existence of the "UU building" 1108 at the position where a "TT apartment" 1105 currently exists can be retrieved. The previous existence of the "PP hall" 1109 at the position where an "LL hall" 1106 currently exists can be retrieved. By using the positional information retrieved as described above, the path from the present location 1101 through the "RR Oil", the "YY Industrial", and the "UU building" to the destination "PP hall" can be found by the search.

When the stopping points are designated as described above, it is important to guide a path passing through the stopping points because it is clear that the path is advantageous (for example, the path is a shortcut or the heavy traffic can be avoided by using the path).

Further, even if a building name in human memory is input when the user is approaching a specific location during the path guidance, the building having the designated name is not found in the vicinity in some cases. Even in such a case, by the history map retrieval using the time-series map, the location of the previously existing building can be retrieved.

Further, when the information of the previously existing building is retrieved, the retrieved position and name of the previously existing building can be repeatedly used by storing the position and the name of the retrieved previously existing building on the car navigation map. Specifically, the "KK store" 1104 and the "YY Industrial" are stored as names relating to the same position. In a similar manner, the "UU building" and the "PP hall" are stored. As a result, the "YY Industrial", the "UU building" and the "PP hall" can be used for a next path search.

Figure 12:
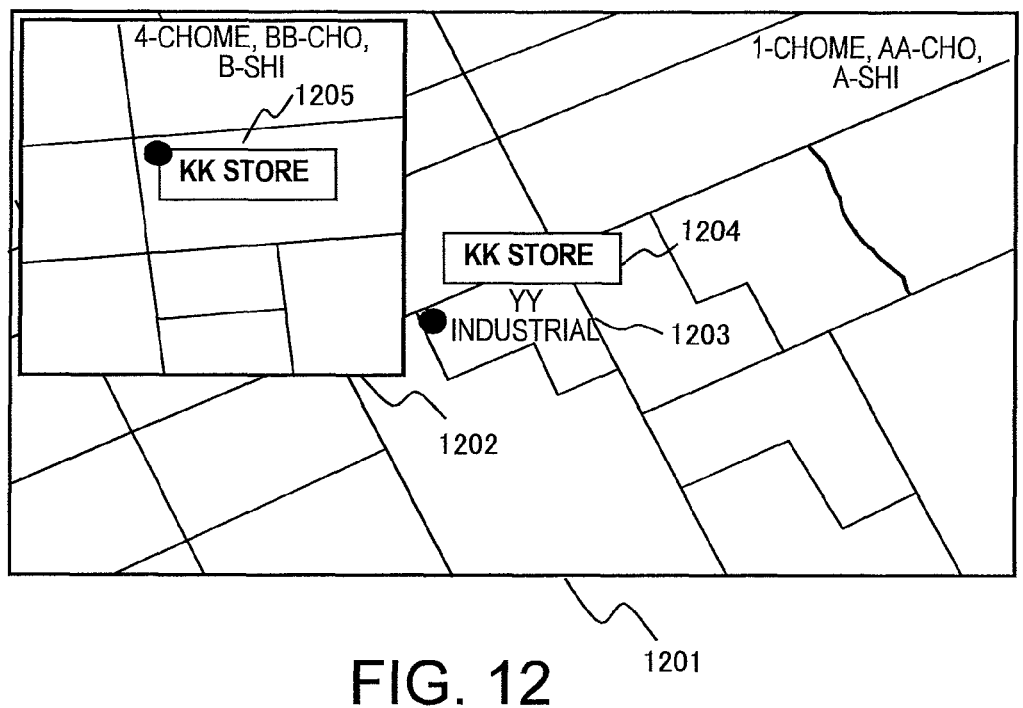
FIG. 12 is an illustrative diagram showing an example of a relocation destination of a store according to the embodiment of this invention.

Moreover, according to the history map retrieval method using the time-series map of this invention, a relocation destination of a store can be retrieved even if the store has moved. For example, as illustrated in FIG. 12, the position of a "KK store" at 1-chome, AA-cho, A-shi is desired to be retrieved, but the "KK store" has moved to 4-chome, BB-cho, B-shi. In the conventional map retrieval, even if the name "KK store" is retrieved on the map showing the vicinity of 1-chome, AA-cho, A-shi, the "YY Industrial" 1203 is now present at the location where the "KK store" previously existed. Therefore, the object building cannot be found.

Therefore, when the "KK store" moved, a coordinate of a reference point of the relocation destination is stored in the attribute data of the "KK store". After the previously existing "KK store" is retrieved by the history retrieval, an area encompassing the reference point of the relocation destination is retrieved by referring to the region management database 102 to read out the map of the retrieved area. The attribute data corresponding to the coordinate of the reference point is checked to specify the location of the relocation destination of the "KK store".

Further, the retrieval of the previous attribute data allows a relocation destination to be tracked over a plurality of generations.

From this point, the previously existing "KK store" 1204 is displayed on a screen 1201 together with the currently existing "YY Industrial" 1203. The "KK store" to be retrieved is displayed in a rectangle in an emphasized manner. Further, a sub-screen 1202 is displayed. On the sub-screen 1202, the present location of the "KK store" 1205 is displayed in an emphasized manner.

Figure 13:
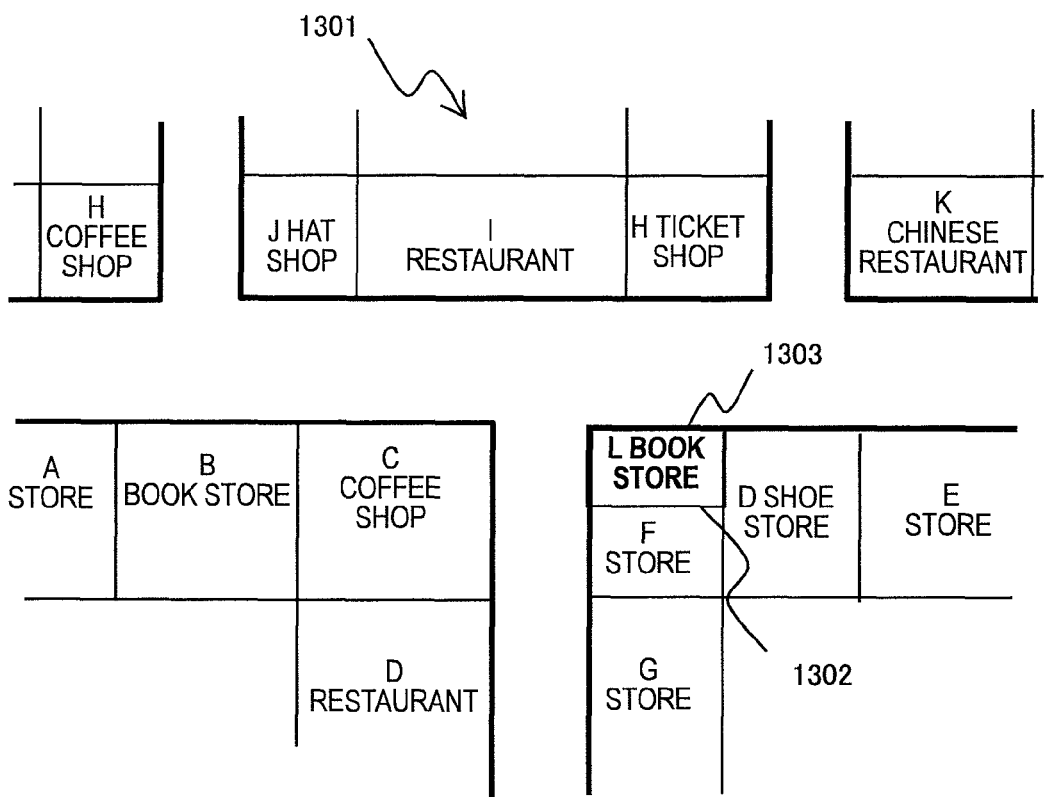
FIG. 13 is an illustrative diagram showing an example of the history map retrieval method used in the underground according to the embodiment of this invention.

The history map retrieval of this invention is not limited to the retrieval of buildings on the ground. For example, as illustrated in FIG. 13, the history map retrieval of this invention can be applied to an underground city map 1301.

Specifically, a name of a tenant is stored in the attribute data. If the attribute data is retrieved by using a name as a key to find the coordinate of the reference point to verify the previous existence of the location, the existence of the tenant can be recognized.

For example, a user having a plurality of different versions of maps 1301 performs navigation by using pre-created underground city maps. Even if an "L book store" 1303 which previously existed is designated as a meeting place, the "L book store" 1303 cannot be found by the conventional navigation because the "L book store" 1303 is now replaced by an "F store" 1103. By using the history map retrieval of this invention, however, the "L book store" 1303 corresponding to a previously existing tenant can be retrieved as illustrated in FIG. 13.

Since the underground city is out of a service area of a GPS satellite, it is necessary to use the positional information acquisition means other than the GPS for specifying the coordinate of the position of the user (client computer). For example, as the positional information acquisition means other than the GPS, a wireless LAN system or a sensor network system may be used to obtain the positional information (coordinate data in an underground area) when the user passes the vicinity of a radiowave source.

In the underground city, the names of tenants frequently change, whereas the configurations of building less frequently change. Therefore, by retrieving the history map data and the history attribute data, the previously existing tenant can be verified.

The graphic configuration data and the attribute data managed in the history map are not limited to the current graphic configuration data and attribute data and the previous graphic configuration and attribute data. For example, the graphic configuration data and the attribute data of a future building are stored respectively in the map database 101 and the attribute database 103. As a result, the retrieval is made possible even in the future. Specifically, a schematic configuration, a name and time information of a building to be constructed are registered as the graphic configuration data 303 and 304 and the attribute data 305 and 306.

As a result, the building can be retrieved over the past, the present time, and the future.

The management of the data of the buildings which not only currently exist but previously existed and will exist in the future by including the time information in the graphic configuration data and the attribute data has been described. However, when the time change information is accumulated, the amount of data becomes enormous. As a result, the retrieval takes a long time. Therefore, the efficiency of retrieval is improved by managing the data in a configuration illustrated in FIG. 14.

Figure 14:
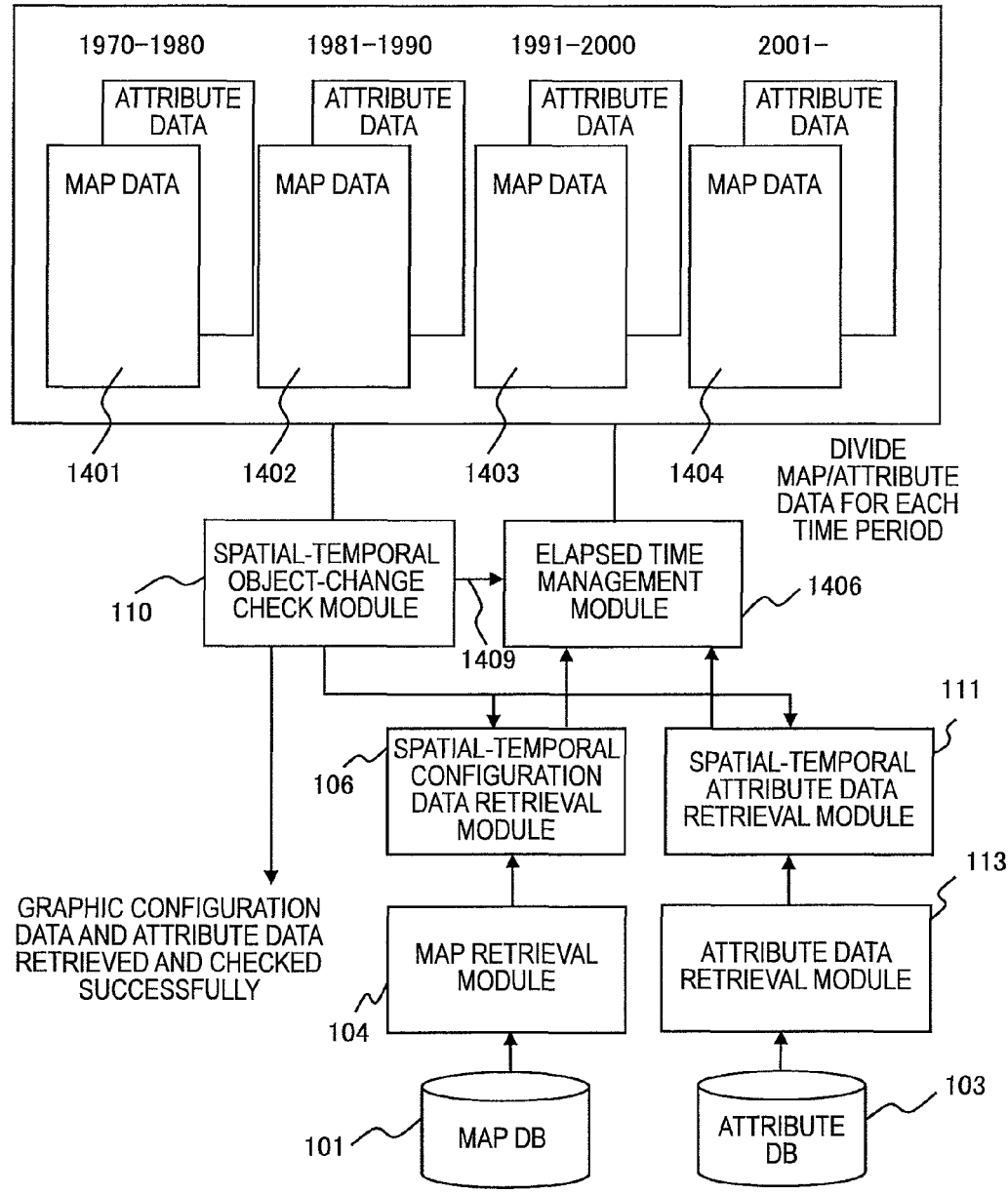
FIG. 14 is a block diagram illustrating a configuration of the historical map data and a historical attribute data according to the embodiment of this invention.

In the example illustrated in FIG. 14, the map data is stored in a divided manner in map data tables, each corresponding to a predetermined period of time. Similarly, the attribute data is stored in a divided manner in attribute data tables, each corresponding to a predetermined period of time. For example, as illustrated in FIG. 14, data can be divided for periods from 1970 to 1980, from 1981 to 1990, from 1991 to 2000, and after 2001. When the graphic configuration data and the attribute data are retrieved backward in time, the latest data (after 2001) is first retrieved. When the data to be retrieved is not present in the period, the retrieval is then performed on the previous period (1991 to 2000) adjacent to the retrieved period.

FIG. 14 illustrates states (1401, 1402, 1403 and 1404) of the map data stored in the map database 101 and the attribute data stored in the attribute database 103 in a divided manner based on the time. In this case, the graphic configuration data and the attribute data which are present over a plurality of periods are stored in a plurality of data tables at the same time.

As is different from FIG. 2 referred to above, an elapsed time management module 1406 is additionally provided in the example illustrated in FIG. 14. The elapsed time management module 1406 manages the period of the map data table and the attribute data table to be referred to. Then, when a signal 1409 indicating uncompleted retrieval (the graphic configuration data and the attribute data to be retrieved are not searched even through the retrieval is performed) is transmitted, the elapsed time management module 1406 designates the previous map data table and attribute data table which are next to be retrieved to designate a retrieval range by the map retrieval module 104 and the spatial-temporal configuration data retrieval module 106, and further by the attribute data retrieval module 113 and the spatial-temporal attribute data retrieval module 111. This process corresponds to Step 714 (see FIG. 7) described above.

Figure 15:
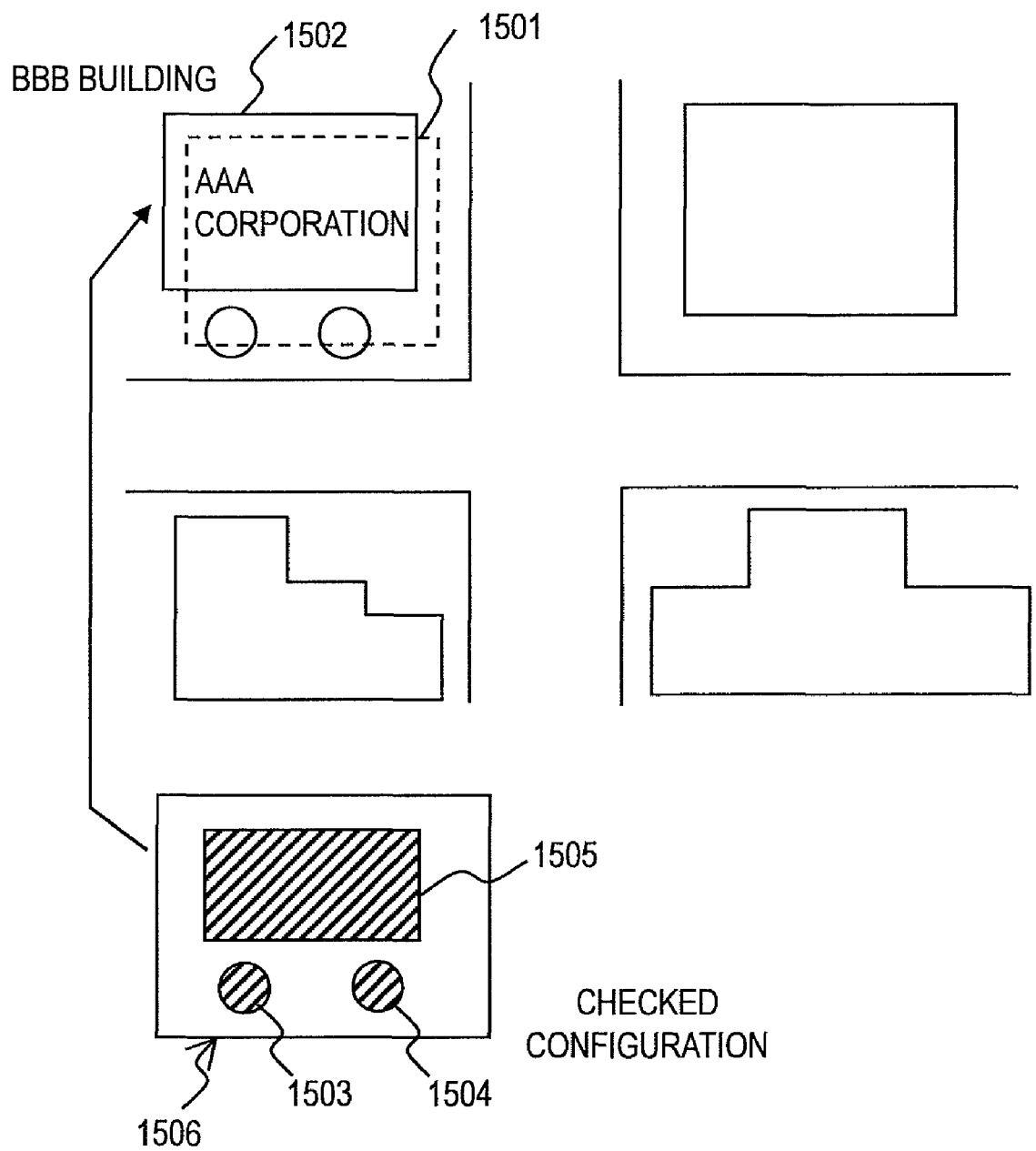
FIG. 15 is an illustrative view for a search using the configuration data as a search key according to the embodiment of this invention.

Moreover, instead of using the attribute as the search key for the retrieval, the retrieval using the configuration as the search key is also considered possible. For example, as illustrated in FIG. 15, a schematic configuration 1506 is input. A configuration corresponding to the input configuration is retrieved backward in time. For inputting the configuration as the search key, a method of directly inputting the configuration on a screen of the computer with a pen or the like can be used.

The retrieval using the configuration as the key as described above is effective when there is a building having a characteristic configuration. The same relation between the data format and the data as that illustrated in FIG. 4 can be used.

For example, as illustrated in FIG. 15, an input of the configuration 1506 serving as the search key is received. For the configuration serving as the search key, two circles 1503 and 1504 and one rectangle 1505 are input. Then, the computer can determine that the configuration 1506 serving as the search key includes one rectangle and two circles close to each other. Therefore, referring to the map data, the graphic configuration data corresponding to the configuration serving as the search key is not found in the current map data (the retrieved configuration currently corresponding to a configuration 1501). In the previous map data, however, the graphic configuration data corresponding to the configuration serving as the search key has been registered. For checking the configuration, a general known pattern matching technique can be used.

Then, the attribute data containing the coordinate of the reference point in the retrieved configuration is retrieved to find a name "BBB building" 1502. In this manner, the use of the history map retrieval enables the configuration of the previously existing building to be checked.

In this case, the configuration data 1501 of the currently existing building (displayed with a dot line) and its name "AAA Corporation" are displayed on the previous graphic configuration data and name in an overlapping manner. In this manner, the change of the building or its attribute can be displayed.

The configuration can be retrieved even when one rectangle and two circles are present in different periods of time. Specifically, the previous map data is retrieved by using the circle as the search key. Then, the retrieval is performed on the map data for the existence of another circle close to the retrieved circle and the rectangle over the retrieval range including different periods of time. When a part of the configuration serving as the search key is identical in each of the periods even when the period of existence is not the same, it is considered that the object to be retrieved has been found.

Once updated to the latest information, the map loses its previous information. According to the embodiment described above, however, the previous data can be maintained to be used for the retrieval without being discarded by managing the data provided with the time information.

Further, even when a tenant which existed at a certain location is replaced by another one, the previously existing tenant can be retrieved by using a name of the previously existing tenant.

As a result, even if the name of the object to be retrieved (and the building having the name) does not currently exist, the retrieval can be performed backward in time without designating the time period on which the retrieval is to be performed. Moreover, the function such as the navigation can be realized by using the attribute data (name or the like) of the building which existed in different periods of time.

Besides, since the previously existing building is specified by using both the map data and the attribute data, the retrieval can be performed backward in time even if the data of a certain period of time is lost.

Further, instead of directly checking the geographic area of the object to be retrieved and the attribute data, the geographic area of the object to be retrieved and the configuration data of the building are first checked. Then, the configuration data of the building and the positional information (reference point) of the attribute data are checked. Therefore, even when the positional information of the attribute data is not contained in the geographic area of the object to be retrieved, the attribute data of the object to be retrieved can be retrieved. For example, when the building is large, the reference point is away from one end of the building. According to the embodiment of this invention, the reference point linked with the building can be retrieved as long as a part of the large building overlaps the geographic search area.

While the present invention has been described in detail and pictorially in the accompanying drawings, the present invention is not limited to such detail but covers various obvious modifications and equivalent arrangements, which fall within the purview of the appended claims.

What is claimed is:

1. A geographic information system using map data including configuration data provided with time information and attribute data corresponding to an attribute of an object contained in the map data, the attribute data being provided with positional information and time information, comprising:
    a processor, a memory coupled to the processor, a communication interface coupled to the processor, and a user interface coupled to the processor;
    an information import module for receiving an input of a geographic area of an object to be retrieved and a search key which does not include time information;
    a map retrieval module configured to use the geographic area and the search key from the information import module while not using any designated date/time, as search parameters for extracting configuration data, for which the input geographic area of the object to be retrieved and an area represented by the configuration data at least partially overlap each other, from the map data;
    a correlation module for correlating the configuration data with the attribute data identical with the search key, for which the area represented by the extracted configuration data overlaps the positional information, according to the time information provided to the configuration data and the time information provided to the attribute data;
    an output module for outputting the configuration data and the attribute data correlated with each other; and
    each of the time information provided to the configuration data and the time information provided to the attribute data indicates a time period in which the object existed or is to exist,
    the map data is stored in a plurality of block areas in a divided manner;
    the map retrieval module specifies the block area of the map data, which includes the input geographic area of the object to be retrieved, and retrieves the configuration data in the specified block area; and
    the correlation module extracts the attribute data for which the retrieved area of the configuration data and the positional information overlap each other;
    checks the extracted configuration data and the attribute data by using the positional information provided to the attribute data;
    correlates a part of the checked configuration data and a part of the checked attribute data, for which the time information provided to the configuration data and the time information provided to the attribute data overlap each other, with each other; and
    selects a piece of the attribute data, which is identical with the search key, from the part of the attribute data correlated with the part of the configuration data.

2. The geographic information system according to claim 1, wherein:
    the positional information provided to the attribute data is a coordinate of a reference point of the object provided with the attribute data; and
    the correlation module checks the configuration data and the attribute data based on whether or not the coordinate of the reference point is contained in the area represented by the configuration data.

3. The geographic information system according to claim 1, wherein the correlation module creates a data set corresponding to a time period in which any of the configuration data and the attribute data correlated with each other does not change, creates a history list obtained by arranging the created data sets in order of time, and selects the attribute data identical with the search key from the created history list.

4. The geographic information system according to claim 1, wherein the output module outputs data for allowing previous data and current data of the configuration data and the attribute data correlated with each other, to be displayed at a position of the configuration data on a map in an overlapping manner.

5. The geographic information system according to claim 1, further comprising a path search module for searching for a path on a map, wherein:
the correlation module specifies a position of the attribute data correlated with the configuration data on the map;
the path search module uses the attribute data whose position has been specified to search for the path; and
the output module outputs the path found by the search.

6. The geographic information system according to claim 1, wherein:
the attribute data includes information of a relocation destination of the object;
the correlation module acquires information of the relocation destination of the object in a case where the information of the relocation destination of the object for which the search key and the attribute data are identical with each other, is included in the attribute data; and
the output module outputs data for displaying the acquired information on a map.

7. The geographic information system according to claim 1, wherein:
the map data and the attribute data are divided based on predefined time periods; and
the correlation module sequentially correlates the divided map data and the divided attribute data with each other, from the map data and the attribute data of the latest time period.

8. The geographic information system according to claim 1, wherein:
the information import module receives an input of a configuration as the search key; and
the correlation module correlates the configuration data with the attribute data that overlaps the configuration data which is extracted and has a configuration identical with the input configuration, according to the time information provided to the configuration data and the time information provided to the attribute data without determining identification of the search key with the attribute data.

9. The geographic information system according to claim 1, further comprising:
a server including a first processor; a memory coupled to the first processor; and a communication interface coupled to the first processor; and
a terminal including a second processor, a memory coupled to the second processor, and a communication interface coupled to the second processor, and a user interface coupled to the second processor, wherein
the server includes the map retrieval module, the correlation module, and the output module; and
the terminal includes the information import module and a display module for displaying data output from the output module.

10. The geographic information system according to claim 1, further comprising:
a terminal including the processor; the memory; the communication interface; and the user interface, wherein
the terminal includes the information import module, the map retrieval module, the correlation module, the output module, and a display module for displaying data output from the output module.

11. A geographic information management method using map data containing configuration data provided with time information and attribute data corresponding to an attribute of an object contained in the map data, the attribute data being provided with positional information and time information, comprising:
receiving an input of a geographic area of an object to be retrieved and a search key which does not include time information;
using the geographic area and the search key from the receiving while not using any designated date/time, as search parameters for extracting configuration data, for which the input geographic area of the object to be retrieved and an area represented by the configuration data at least partially overlap each other, from the map data;
correlating the configuration data with the attribute data identical with the search key, for which the area represented by the extracted configuration data overlaps the positional information, according to the time information provided to the configuration data and the time information provided to the attribute data;
outputting the configuration data and the attribute data correlated with each other; and
each of the time information provided to the configuration data and the time information provided to the attribute data indicates a time period in which the object existed or is to exist;
the map data is stored in a plurality of block areas in a divided manner;
the extracting the configuration data includes specifying the block area of the map data, which includes the input geographic area of the object to be retrieved and retrieving the configuration data in the specified block area,
the correlating the attribute data with the configuration data includes:
extracting the attribute data for which the retrieved area of the configuration data and the positional information overlap each other;
checking the extracted configuration data and the attribute data by using the positional information provided to the attribute data;
correlating a part of the checked configuration data and a part of the checked attribute data, for which the time information provided to the configuration data and the time information provided to the attribute data overlap each other, with each other; and
selecting a piece of the attribute data, which is identical with the input search key, is selected from the part of the attribute data correlated with the part of the configuration data.

12. The geographic information management method according to claim 11, wherein:
the positional information provided to the attribute data is a coordinate of a reference point of the object provided with the attribute data; and
the checking the extracted configuration data and the attribute data by using the positional information includes checking the configuration data and the attribute data, based on whether or not the coordinate of the reference point is contained in the area represented by the configuration data.

13. The geographic information management method according to claim 11, wherein:
   the correlating a part of the checked configuration data and a part of the checked attribute data having the overlapping time information with each other includes creating a data set corresponding to a time period, in which any of the configuration data and the attribute data correlated with each other does not change, and creating a history list obtained by arranging the created data sets in order of time; and
   the selecting a piece of the attribute data includes selecting the attribute data identical with the search key from the created history list.

14. The geographic information management method according to claim 11, wherein the outputting the configuration data and the attribute data includes displaying previous data and current data of the configuration data and previous data and current data of the attribute data correlated with each other at a position of the configuration data, on a map in an overlapping manner.

15. The geographic information management method according to claim 11, further comprising:
   specifying a position of the attribute data correlated with the configuration data on the map;
   searching for the path by using the attribute data whose position has been specified; and
   outputting the path found by the search.

16. The geographic information management method according to claim 11, wherein:
   the attribute data contains information of a relocation destination of the object;
   the method further comprises acquiring information of the relocation destination of the object in a case where the information of the relocation destination of the object for which the search key and the attribute data are identical with each other, is contained in the attribute data; and
   the outputting the configuration data and the attribute data includes displaying the acquired information of the relocation destination on a map.

17. The geographic information management method according to claim 11, wherein:
   the map data and the attribute data are divided based on predefined time periods; and
   the correlating the attribute data and the configuration data with each other, includes sequentially correlating the divided map data and the divided attribute data with each other from the map data and the attribute data of the latest time period.

18. The geographic information management method according to claim 11, wherein:
   the receiving the input includes receiving an input of a configuration as the search key; and
   the correlating the attribute data with the configuration data, includes correlating the attribute data overlapping the configuration data which is extracted and has a configuration identical with the input configuration with the configuration data according to the time information provided to the configuration data and the time information provided to the attribute data, without determining identification of the search key with the attribute data.

19. The geographic information system according to claim 1, wherein the search key is more particularly, a name-based search key not including time information.

20. The geographic information system according to claim 1, wherein the output module outputs data for allowing objects which existed at different times at a same location, to be displayed in an overlapping manner, wherein the objects include at least one of a building, a building sub-structure, a store, a landmark, a tenancy and an establishment.

21. The geographic information management method according to claim 11, wherein the search key is more particularly, a name-based search key not including time information.

22. The geographic information management method according to claim 11, wherein the output module outputs data for allowing objects which existed at different times at a same location, to be displayed in an overlapping manner, wherein the objects include at least one of a building, a building sub-structure, a store, a landmark, a tenancy and an establishment.

* * * * *